(12) United States Patent
Stegemeier et al.

(10) Patent No.: US 7,534,926 B2
(45) Date of Patent: May 19, 2009

(54) SOIL REMEDIATION USING HEATED VAPORS

(75) Inventors: George L. Stegemeier, Houston, TX (US); Harold J. Vinegar, Bellaire, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 561 days.

(21) Appl. No.: 10/438,779

(22) Filed: May 15, 2003

(65) Prior Publication Data

US 2004/0228690 A1 Nov. 18, 2004

(51) Int. Cl.
*A62D 3/00* (2007.01)
(52) U.S. Cl. .................... 588/321; 588/253; 588/405
(58) Field of Classification Search ............... 588/321, 588/405, 253, 249
See application file for complete search history.

(56) References Cited

U.S. PATENT DOCUMENTS

| | | | |
|---|---|---|---|
| 2,777,679 A | 1/1957 | Ljunstrom | |
| 2,902,270 A | 9/1959 | Salomonsson et al. | |
| 3,181,613 A | 5/1965 | Krueger | |
| 3,684,037 A | 8/1972 | Bodine | |
| 4,017,309 A | 4/1977 | Johnson | |
| 4,276,164 A | 6/1981 | Martone et al. | |
| 4,380,930 A | 4/1983 | Podhrasky et al. | |
| 4,423,323 A | 12/1983 | Ellis et al. | |
| 4,500,327 A | 2/1985 | Nishino et al. | |
| 4,529,497 A | 7/1985 | Watson et al. | |
| 4,577,503 A | 3/1986 | Imaino et al. | |
| 4,598,392 A | 7/1986 | Pann | |
| 4,641,028 A | 2/1987 | Taylor et al. | |
| 4,670,634 A | 6/1987 | Bridges et al. | |
| 4,704,514 A | 11/1987 | van Egmond et al. | |
| 4,842,448 A | 6/1989 | Koerner et al. | |
| 4,860,544 A | 8/1989 | Krieg et al. | |
| 4,973,811 A | 11/1990 | Bass | |
| 4,974,425 A | 12/1990 | Krieg et al. | |
| 4,984,594 A | 1/1991 | Vinegar et al. | |
| 5,060,287 A | 10/1991 | Van Egmond | |
| 5,067,852 A | 11/1991 | Plunkett | |
| 5,076,727 A | 12/1991 | Johnson et al. | |
| 5,114,497 A | 5/1992 | Johnson et al. | |
| 5,152,341 A | 10/1992 | Kasevich | |
| 5,169,263 A | 12/1992 | Johnson et al. | |
| 5,190,405 A | 3/1993 | Vinegar et al. | |
| 5,193,934 A | 3/1993 | Johnson et al. | |
| 5,209,604 A | 5/1993 | Chou | |
| 5,221,287 A | 6/1993 | Reinert | |
| 5,221,827 A | 6/1993 | Marsden, Jr. et al. | |
| 5,228,804 A | 7/1993 | Balch | |
| 5,229,583 A | 7/1993 | van Egmond et al. | |
| 5,232,951 A | 8/1993 | Pfingstl et al. | |
| 5,233,164 A | 8/1993 | Dicks et al. | |
| 5,244,310 A | 9/1993 | Johnson | |
| 5,249,368 A | 10/1993 | Bertino et al. | |
| 5,251,700 A | 10/1993 | Nelson et al. | |
| 5,255,742 A | 10/1993 | Mikus | |
| 5,256,208 A | 10/1993 | Rafson | |
| 5,261,765 A | 11/1993 | Nelson | |
| 5,271,693 A | 12/1993 | Johnson et al. | |
| 5,305,239 A | 4/1994 | Kinra | |
| 5,318,116 A | 6/1994 | Vinegar et al. | |
| 5,325,795 A | 7/1994 | Nelson et al. | |
| 5,340,236 A | 8/1994 | Ikenberry | |
| 5,348,422 A | 9/1994 | Manchak, III et al. | |
| 5,360,067 A | 11/1994 | Meo, III | |
| 5,362,397 A | 11/1994 | Cyr | |
| 5,403,119 A | 4/1995 | Hoyle | |
| 5,435,666 A | 7/1995 | Hassett et al. | |
| 5,441,365 A | 8/1995 | Duffney et al. | |
| 5,545,803 A | 8/1996 | Heath et al. | |

(Continued)

FOREIGN PATENT DOCUMENTS

DE 3716275 11/1988

(Continued)

OTHER PUBLICATIONS

U.S. Appl. No. 09/549,902 to Vinegar et al. entitled, "Vapor Collection and Treatment of Off-Gas From an In-Situ Thermal Desorption Soil Remediation", no date month.

(Continued)

*Primary Examiner*—Edward M Johnson
(74) *Attorney, Agent, or Firm*—Meyertons, Hood, Kivlin, Kowert & Goetzel, P.C.; Eric B. Meyertons

(57) ABSTRACT

Methods are provided for remediating contaminated soil. The methods may include collecting contaminated soil at a plurality of treatment sites. The contaminated soil at one or more of the plurality of treatment sites may be at least partially contained. Vapors produced from heating soil at one site may be used to heat contaminated soil at another site. A fluid directed to a portion of heated contaminated soil may accelerate heat transfer through the site of contaminated soil or through another site of contaminated soil. A method may include heating contaminated soil from more than one site at substantially the same time. Heating contaminated soil from more than one site at substantially the same time may include in situ and ex situ treatment at a common location.

29 Claims, 19 Drawing Sheets

U.S. PATENT DOCUMENTS

| | | | |
|---|---|---|---|
| 5,547,311 | A | 8/1996 | Kenda |
| 5,553,189 | A | 9/1996 | Stegemeier et al. |
| 5,558,463 | A | 9/1996 | Geisel |
| 5,569,154 | A | 10/1996 | Navetta |
| 5,613,452 | A | 3/1997 | Marchesi et al. |
| 5,615,974 | A | 4/1997 | Land et al. |
| 5,656,239 | A | 8/1997 | Stegemeier et al. |
| 5,660,500 | A | 8/1997 | Marsden, Jr. et al. |
| 5,664,911 | A | 9/1997 | Bridges et al. |
| 5,674,424 | A | 10/1997 | Iben et al. |
| 5,753,494 | A | 5/1998 | Hater et al. |
| 5,779,762 | A | 7/1998 | Kohr et al. |
| 5,788,412 | A | 8/1998 | Jatkar |
| 5,813,799 | A | 9/1998 | Calcote et al. |
| 5,829,918 | A | 11/1998 | Chintis |
| 5,836,718 | A | 11/1998 | Price |
| 5,997,214 | A | 12/1999 | de Rouffignac et al. |
| 6,039,508 | A | 3/2000 | White |
| 6,102,622 | A | 8/2000 | Vinegar et al. |
| 6,260,464 | B1 * | 7/2001 | Gorrell et al. .................. 86/50 |
| 6,419,423 | B1 | 7/2002 | Vinegar et al. |
| 6,485,232 | B1 | 11/2002 | Vinegar et al. |
| 6,543,539 | B1 | 4/2003 | Vinegar et al. |
| 6,632,047 | B2 | 10/2003 | Vinegar et al. |
| 6,688,387 | B1 | 2/2004 | Wellington et al. |
| 6,824,328 | B1 | 11/2004 | Vinegar et al. |
| 6,854,929 | B2 | 2/2005 | Vinegar et al. |
| 7,019,190 | B1 * | 3/2006 | Lucas et al. .................. 588/320 |
| 2002/0003988 | A1 | 1/2002 | Mikus et al. |
| 2003/0110794 | A1 | 6/2003 | Stegemeier et al. |
| 2003/0136558 | A1 | 7/2003 | Wellington et al. |
| 2003/0192691 | A1 | 10/2003 | Vinegar et al. |
| 2004/0120771 | A1 | 6/2004 | Vinegar et al. |
| 2004/0120772 | A1 | 6/2004 | Vinegar et al. |
| 2004/0126190 | A1 | 7/2004 | Stegemeier et al. |
| 2004/0228688 | A1 | 11/2004 | Stegemeier et al. |
| 2004/0228689 | A1 | 11/2004 | Stegemeier et al. |
| 2006/0171780 | A1 | 8/2006 | Richter |

FOREIGN PATENT DOCUMENTS

| | | |
|---|---|---|
| DE | 198 24 930 | 12/1992 |
| DE | 19707 096 | 5/1998 |
| DE | 196 48 928 | 6/1998 |
| DE | 198 01 321 | 7/1999 |
| DE | 199 27 134 | 12/2000 |
| EP | 592 225 | 4/1994 |
| GB | 1 366 357 | 9/1974 |
| WO | 98/52704 | 11/1998 |

OTHER PUBLICATIONS

Vinegar et al.; "In Situ Thermal Desorption of Soils Impacted with Chlorinated Solvents"; 1999; 23 pgs, no date month.

Vinegar et al.; "In Situ Thermal Desorption using Thermal Wells and Blankets"; 1998; 1 pg, no date month.

Conley et al.; "In Situ Thermal Desorption of Refined Petroleum Hydrocarbons from Saturated Soil"; 2000; pp. 1-10, no date month.

Hansen et al.; "In Situ Thermal Desorption of Coal Tar"; 1998; pp. 1-22, no date month.

Vinegar et al.; "Remediation of Deep Soil Contamination using Thermal Vacuum Wells"; Society of Petroleum Engineers; 1997; pp. 905-918, no date month.

Heron et al., "Soil Heating for Enhanced Remediation of Chlorinated Solvents: A Laboratory Study on Resistive Heating and Vapor Extraction in a Silty, Low-Permeable Soil Contaminated with Trichloroethylene"; Environmental science & Technology; 1998; 32(10); pp. 1474-1481, no date month.

U.S. Army Corps of Engineers Pamphlet EP 415-1-261, 1997, Chapter 6, 12 pages, no month.

International Search Report for PCT/US02/34199 mailed Jul. 2, 2003, 8 pages.

International Search Report for PCT/US02/34273 mailed Feb. 18, 2003, 3 pages.

International Search Report for PCT/US02/34532 mailed Aug. 5, 2003, 3 pages.

U.S. Patent and Trademark Office, "Office Communication" for U.S. Appl. No. 10/279,771, Mailed Oct. 13, 2004 (8 pages).

U.S. Patent and Trademark Office, "Office Communication" for U.S. Appl. No. 10/438,780, Mailed Sep. 29, 2004 (6 pages).

Patent Cooperation Treaty Communication, International Search Report for International Application No. PCT/EP98/03017 mailed on Sep. 16, 1998.

Patent Cooperation Treaty Communication, International Search Report for International Application PCT/US04/15260 mailed Jan. 4, 2005, 7 pages.

Patent Cooperation Treaty Communication, International Opinion of the International Searching Authority for International Application PCT/US04/15260 mailed Jan. 4, 2005, 3 pages.

Patent Cooperation Treaty Communication, International Search Report for International Application No. PCT/US04/15489 mailed on Jun. 30, 2005; 4 pages.

Patent Cooperation Treaty Communication, International Written Opinion for International Application No. PCT/US04/15489 mailed on Jun. 30, 2005; 4 pages.

* cited by examiner

SOIL REMEDIATION USING HEATED VAPORS

BACKGROUND

1. Field of the Invention

The present invention generally relates to soil remediation systems and methods. Embodiments of the invention relate to systems and methods of heating contaminated soil at one or more treatment sites.

2. Description of Related Art

Soil contamination is a matter of concern in many locations. "Soil" refers to unconsolidated and consolidated material in the ground. Soil may include natural formation material such as dirt, sand, and rock, as well as fill material. Soil may be contaminated with chemical, biological, and/or radioactive compounds. Contamination of soil may occur in a variety of ways, such as material spillage, leakage from storage vessels, and landfill seepage. Public health concerns may arise if contaminants migrate into aquifers or into air. Soil contaminants may also migrate into the food supply through bioaccumulation in various species in a food chain.

There are many ways to remediate contaminated soil. "Remediating soil" means treating the soil to reduce contaminant levels within the soil or to remove contaminants from the soil. An ex situ method of remediating contaminated soil is to excavate the soil and then process the soil in a separate treatment facility to reduce contaminant levels within the soil or to remove contaminants from the soil. Alternatively, contaminated soil may be remediated in situ.

Thermal desorption is a soil remediation process that may involve in situ or ex situ heating of contaminated soil. Heating the soil may reduce soil contamination by processes including, but not limited to, vaporization and vapor transport of contaminants from the soil, entrainment and removal of contaminants in water vapor and/or an air stream, thermal degradation (e.g., pyrolysis), and/or conversion of contaminants into non-contaminant compounds by oxidation or other chemical reactions within the soil. During thermal remediation, a vacuum may be applied to the soil to remove off-gas from the soil. Vacuum may be applied at a soil/air interface or through collection ports (e.g., vacuum or vapor extraction wells) placed within the soil. The vapors may entrain volatile contaminants and carry these contaminants toward the vacuum source. Vapors removed from the soil by the vacuum may include contaminants from the soil. The vapors may be transported to a treatment facility. The vapors removed from the soil may be processed in the treatment facility to remove contaminants from the vapors or to reduce contaminant levels within the vapors.

Soil may be heated by methods including, but not limited to, radiative heating, conductive heating, radio frequency heating, and/or electrical resistivity heating. For shallow contaminated soil, a thermal blanket placed on top of the soil or heaters placed horizontally in trenches within the contaminated soil may be used to apply heat to the soil. Shallow contaminated soil includes soil contamination that does not extend below a depth of about 1 m to about 2 m. For deeper contaminated soil, heater wells or heater/vapor extraction wells may be used to apply heat to the soil.

A vacuum may be applied to remove vapors from contaminated soil. U.S. Pat. No. 4,984,594 issued to Vinegar et al., which is incorporated by reference as if fully set forth herein, describes an in situ thermal desorption (ISTD) process for soil remediation of low depth soil contamination. U.S. Pat. No. 5,318,116 issued to Vinegar et al., which is incorporated by reference as if fully set forth herein, describes an ISTD process for treating contaminated subsurface soil with conductive heating.

Heat added to contaminated soil may raise a temperature of the soil above vaporization temperatures of soil contaminants. If soil temperature exceeds a vaporization temperature of a soil contaminant, the contaminant may vaporize. A vacuum may be used to draw the vaporized contaminant out of the soil. The presence of water vapor may result in vaporization of less volatile contaminants at or near the boiling point of water. Heating the soil to a temperature below vaporization temperatures of contaminants may also have beneficial effects. Increasing soil temperature may increase a vapor pressure of contaminants in the soil and allow a vacuum system to remove a greater portion of contaminants from the soil than possible at lower soil temperatures. Evaporation of contaminants into air or water vapor streams may be enhanced by heating. Heat applied to the soil may also result in the destruction of contaminants in situ.

U.S. Pat. No. 5,190,405 issued to Vinegar et al., which is incorporated by reference as if fully set forth herein, describes an in situ method for removing soil contaminants using thermal conduction heating and application of a vacuum.

U.S. Pat. No. 5,229,583 issued to van Egmond et al., U.S. Pat. No. 5,233,164 issued to Dicks et al., and U.S. Pat. No. 5,221,827 issued to Marsden et al., all of which are incorporated by reference as if fully set forth herein, describe surface heating soil remediation systems.

U.S. patent application Ser. No. 09/549,902 of Vinegar et al. and U.S. patent application Ser. No. 09/836,447 of Vinegar et al., both of which are incorporated by reference as if fully set forth herein, describe heater elements placed horizontally within trenches in the soil for remediation.

U.S. Pat. No. 5,553,189 issued to Stegemeier et al., which is incorporated by reference as if fully set forth herein, describes a shallow pit for remediating near surface soil contamination.

U.S. Pat. No. 5,249,368 issued to Bertino et al., which is incorporated by reference as if fully set forth herein, describes a sealed roll-off container for contaminated soil.

A soil remediation system may include four major systems. The systems may be a heating and vapor extraction system, an off-gas collection piping system, an off-gas treatment system, and instrumentation and power control systems.

A heating and vapor extraction system may be formed of wells inserted into the soil for deep soil contamination or of thermal blankets for shallow soil contamination. A combination of wells and thermal blankets may also be used. For example, thermal blankets may be placed at centroids of groups of wells. The thermal blankets may inhibit condensation of contaminants near the soil surface. Soil may be heated by a variety of methods. Methods for heating soil include, but are not limited to, heating substantially by thermal conduction, heating by radio frequency heating, or heating by electrical soil resistivity heating. Thermal conductive heating may be advantageous because temperature obtainable by thermal conductive heating is not dependent on an amount of water or other polar substance in the soil. Soil temperatures substantially above the boiling point of water may be obtained using thermal conductive heating. Soil temperatures of about 100° C., 200° C., 300° C., 400° C., 500° C. or greater may be obtained using thermal conductive heating.

Wells may be used to supply heat to the soil and to remove vapor from the soil. The term "wells" refers to heater wells, vapor extraction wells, and/or combination heater/vapor extraction wells. Heater wells supply thermal energy to the soil. Vapor extraction wells may be used to remove off-gas from the soil. Vapor extraction wells may be connected to an off-gas collection piping system. A vapor extraction well may be coupled to a heater well to form a heater/vapor extraction well. In a region adjacent to a heater/vapor extraction well, air and vapor flow within the soil may be counter-current to heat flow through the soil. The heat flow may produce a temperature gradient within the soil. The counter-current heat transfer relative to mass transfer may expose air and vapor that is drawn to a vacuum source to high temperatures as the air and vapor approaches and enters the heater/vapor extraction well. A significant portion of contaminants within the air and vapor may be destroyed by pyrolysis and/or oxidation when the air and vapor passes through high temperature zones surrounding and in heater/vapor extraction wells. In some soil remediation systems, only selected wells may be heater/vapor extraction wells. In some soil remediation systems, heater wells may be separate from the vapor extraction wells. In some embodiments, heaters within heater wells and within heater/vapor extraction wells may operate in a range from about 650° C. to about 870° C.

Thermal conductive heating of soil may include radiatively heating a well casing, which conductively heats the surrounding soil. Coincident or separate source vacuum may be applied to remove vapors from the soil. Vapor may be removed from the soil through extraction wells. U.S. Pat. No. 5,318,116 issued to Vinegar et al., which is incorporated by reference as if fully set forth herein, describe ISTD processes for treating contaminated subsurface soil with thermal conductive heating applied to soil from a radiantly heated casing. The heater elements are commercial nichrome/magnesium oxide tubular heaters with Inconel 601 sheaths operated at temperatures up to about 1250° C. Alternatively, silicon carbide or lanthanum chromate "glow-bar" heater elements, carbon electrodes, or tungsten/quartz heaters could be used for still higher temperatures. The heater elements may be tied to a support member by banding straps.

Wells may be arranged in a number of rows and columns. Wells may be staggered so that the wells are in a triangular pattern. Alternatively, the wells may be aligned in a rectangular pattern, pentagonal pattern, hexagonal pattern or higher order polygonal pattern. In certain well pattern embodiments, a length between adjacent wells is a fixed distance so that a polygonal well pattern is a regular well pattern, such as an equilateral triangle well pattern or a square well pattern. In other well pattern embodiments, spacing of the wells may result in non-regular polygonal well patterns. A spacing distance between two adjacent wells may range from about 1 m to about 13 m or more. A typical spacing distance may be from about 2 m to about 4 m.

Wells inserted into soil may be extraction wells, injection wells and/or test wells. An extraction well may be used to remove off-gas from the soil. The extraction well may include a perforated casing that allows off-gas to pass from the soil into the extraction well. The perforations in the casing may be, but are not limited to, holes and/or slots. The perforations may be screened. The casing may have several perforated zones at different positions along a length of the casing. When the casing is inserted into the soil, the perforated zones may be located adjacent to contaminated layers of soil. The areas adjacent to perforated sections of a casing may be packed with gravel or sand. The casing may be sealed to the soil adjacent to non-producing layers to inhibit migration of contaminants into uncontaminated soil. An extraction well may include a heating element that allows heat to be transferred to soil adjacent to the well.

In some soil remediation processes, a fluid may be introduced into the soil. The fluid may be, but is not limited to, a heat source such as steam, a solvent, a chemical reactant such as an oxidant, or a biological treatment carrier. A fluid, which may be a liquid or gas, may be introduced into the soil through an injection well. The injection well may include a perforated casing. The injection well may be similar to an extraction well except that fluid is inserted into the soil through perforations in the well casing instead of being removed from the soil through perforations in the well casing.

A well may also be a test well. A test well may be used as a gas sampling well to determine location and concentration of contaminants within the soil. A test well may be used as a logging observation well. A test well may be an uncased opening, a cased opening, a perforated casing, or combination cased and uncased opening.

A wellbore for an extraction well, injection well, or test well may be formed by augering a hole into the soil. Cuttings made during the formation of the augered hole may have to be treated separately from the remaining soil. Alternatively, a wellbore for an extraction well, injection well, or test well may be formed by driving and/or vibrating a casing or insertion conduit into the soil. U.S. Pat. No. 3,684,037 issued to Bodine and U.S. Pat. No. 6,039,508 issued to White describe devices for sonically drilling wells. Both of these patents are incorporated by reference as if fully set forth herein.

A covering may be placed over a treatment area. The covering may inhibit fluid loss from the soil to the atmosphere, heat loss to the atmosphere, and fluid entry into the soil. Heat and vacuum may be applied to the cover. The heat may inhibit condensation of contaminants on the covering and in soil adjacent to the covering. The vacuum may remove vaporized contaminants from the soil adjacent to a soil/air interface to an off-gas treatment system.

An off-gas collection piping system may be connected to vapor extraction wells of a heating and vapor extraction system. The off-gas collection piping system may also be connected to an off-gas treatment system so that off-gas removed from the soil may be transported to the treatment system. Typical off-gas collection piping systems are made of metal pipe. The off-gas collection piping may be un-heated piping that conducts off-gas and condensate to the treatment facility. Alternatively, the off-gas collection piping may be heated piping that inhibits condensation of off-gas within the collection piping. The use of metal pipe may make a cost of a collection system expensive. Installation of a metal pipe collection system may be labor and time intensive. In some embodiments, off-gas collection piping may be or may include polymer piping and/or flexible hose.

Off-gas within a collection piping system may be transported to an off-gas treatment system. The treatment system may include a vacuum system that draws off-gas from the soil. The treatment system may also remove contamination within the off-gas to acceptable levels. The treatment facility may include a reactor system, such as a thermal oxidizer, to eliminate contaminants or to reduce contaminants within the off-gas to acceptable levels. Alternatively, the treatment system may use a mass transfer system, such as passing the off-gas through activated carbon beds, to eliminate contaminants or to reduce contaminants within the off-gas to acceptable levels. A combination of a reactor system and a mass transfer system may also be used to eliminate contaminants or to reduce contaminants within the off-gas to acceptable levels.

Instrumentation and power control systems may be used to monitor and control the heating rate of a soil remediation system. The instrumentation and power control system may also be used to monitor the vacuum applied to the soil and to control of the operation of the off-gas treatment system. Electrical heaters may require controllers that inhibit the heaters from overheating. The type of controller may be dependent on the type of electricity used to power the heaters. For example, a silicon controlled rectifier may be used to control power applied to a heater that uses a direct current power source, and a zero crossover electrical heater firing controller may be used to control power applied to a heater that uses an alternating current power source. In some embodiments, the use of controllers may not be necessary.

A barrier may be placed around a region of soil that is to be treated. The barrier may include metal plates that are driven into the soil around a perimeter of a contaminated soil region. A top cover for the soil remediation system may be sealed to the barrier. The barrier may limit the amount of air and water drawn into the treatment area from the surroundings. The barrier may also inhibit potential spreading of contamination from the contaminated region to adjacent areas and/or the atmosphere.

SUMMARY

In a soil remediation embodiment, vapors produced by heating soil at a first site may be used to provide heat to contaminated soil at a second site. Transfer of the heated vapors from the first site to the second site may cause cooling of the first site as well as heating of the second site. Transfer of heat from the first site to the second site may reduce the heating requirements at the second site and thereby reduce energy consumption of soil remediation at the second site. Additionally, removing heated vapors from a first site may reduce an amount of time required to cool the treated soil at the first site.

In a soil remediation embodiment, contaminants may be removed from contaminated soil at a site by heating the contaminated soil at the site. As the contaminated soil is heated, a fluid may be introduced into the site. The fluid may be, but is not limited to, air, a heat transfer fluid, a drive fluid, a reactant, a solvent, a surfactant, liquid water, and/or steam. The fluid may be used to move contamination within the soil, remove contamination from the soil, and/or drive vapors from one site to another site. The fluid may also be used to transfer heat through the contaminated soil. Using a fluid to transfer heat through contaminated soil may reduce the heating requirements at a site for remediation.

A soil remediation embodiment may include heating contaminated soil collected from more than one location at substantially the same time. A combination of ex situ and in situ methods may be used to remediate contaminated soil collected from more than one location. For example, heaters may be placed in contaminated soil and/or on a surface of contaminated soil at a site. Contaminated soil collected from one or more other locations may be added to the site. Additional heaters may be placed in the contaminated soil and/or on a surface of the contaminated soil collected from the other locations. The heaters may therefore heat and at least partially remediate contaminated soil collected from more than one location substantially simultaneously at one site.

BRIEF DESCRIPTION OF THE DRAWINGS

Advantages of the invention will become apparent upon reading the following detailed description and upon reference to the accompanying drawings in which.

Figure 1:
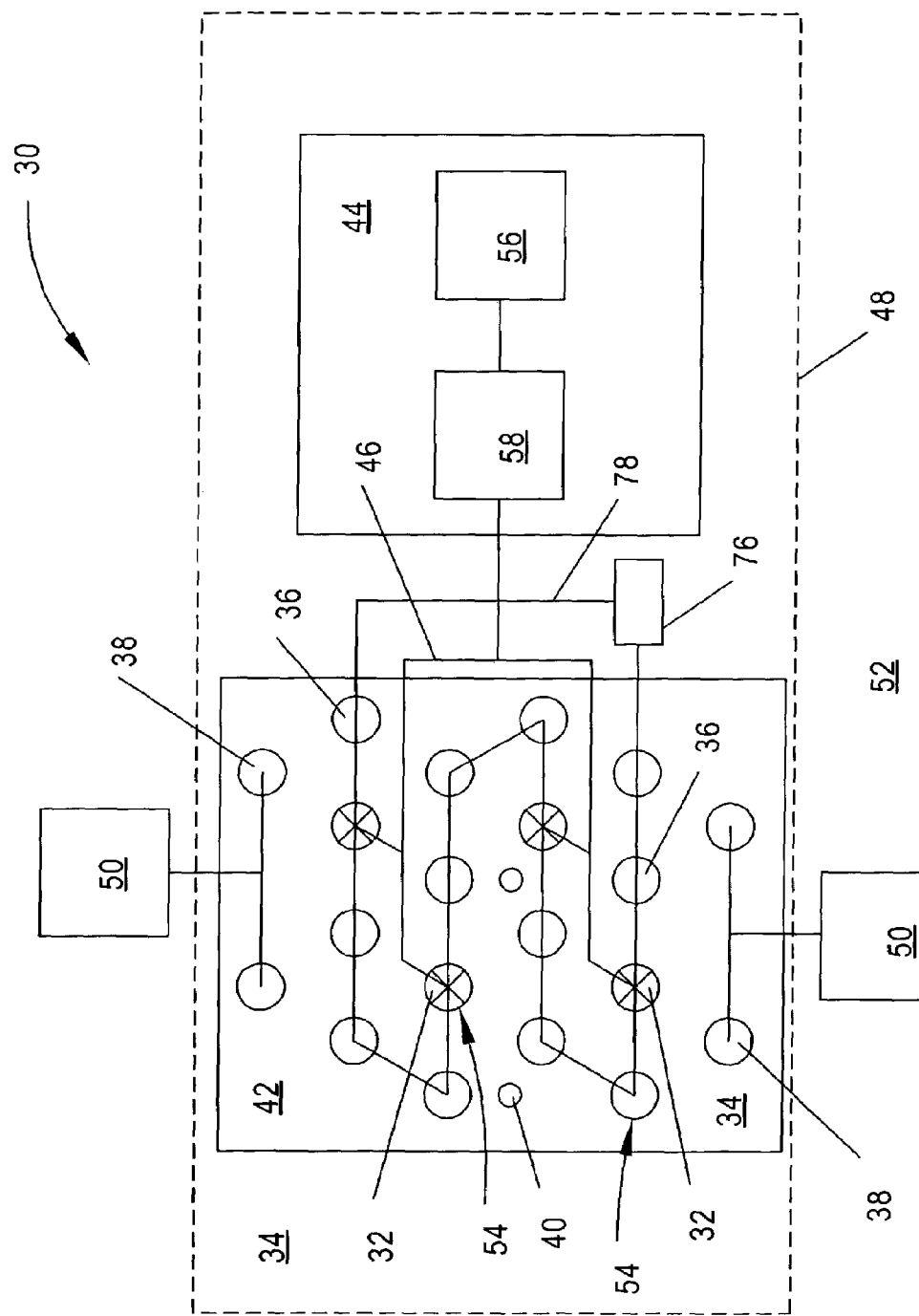
FIG. 1 shows a schematic plan view representation of an embodiment of a soil remediation system.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION

Figure 2:
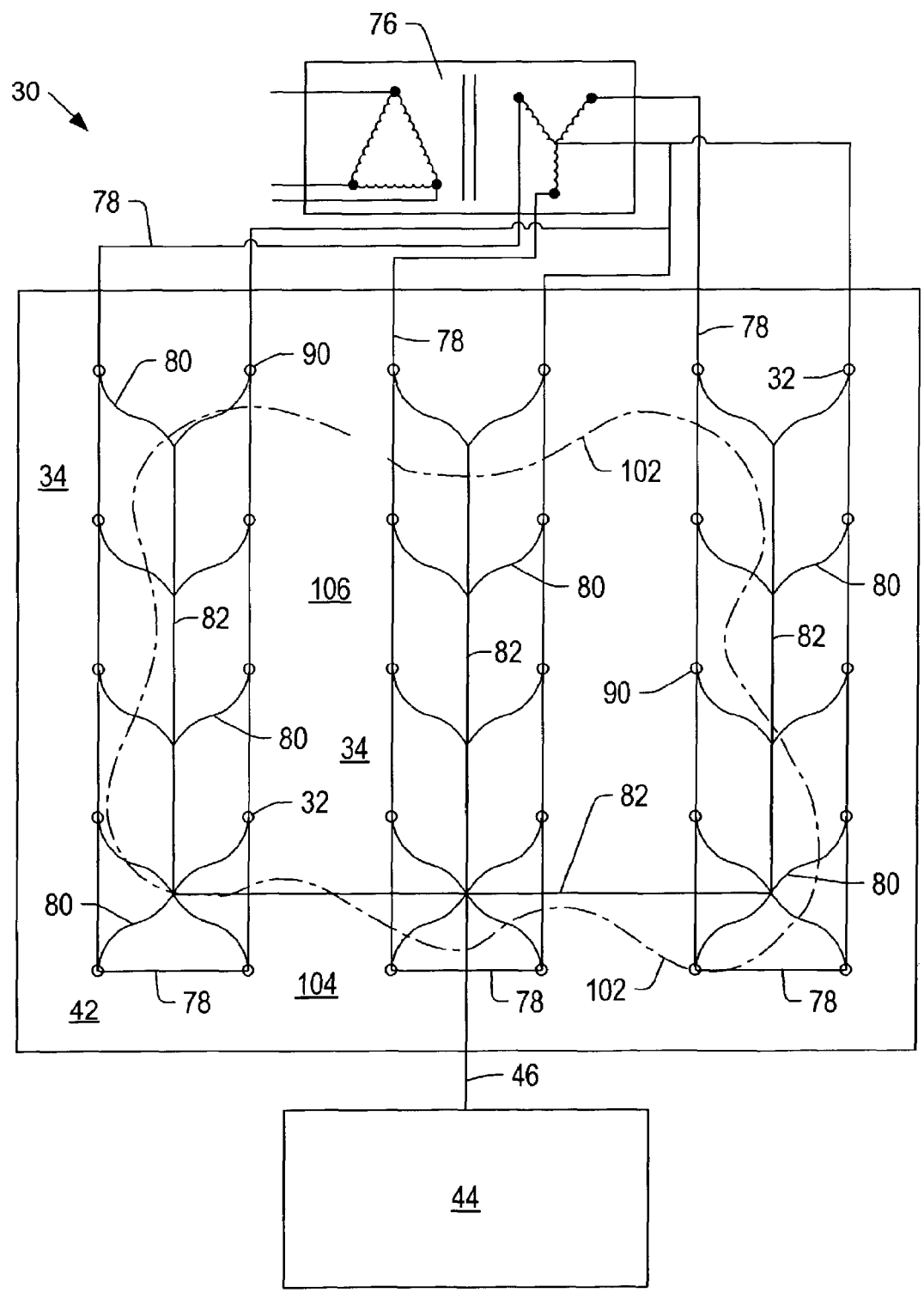
FIG. 2 shows a schematic plan view representation of an embodiment of a soil remediation system.

A soil remediation system may remove or reduce contaminants within a selected soil region. FIGS. 1 and 2 show schematic representations of embodiments of soil remediation systems 30. Soil remediation system 30 depicted in FIG. 1 may include one or more extraction wells 32 within soil 34. Soil remediation system 30 may optionally include one or more heat injection wells 36, one or more fluid injection wells 38, and one or more test wells 40. Fluid injection wells 38 and/or test wells 40 may be located inside or outside of a pattern of extraction wells 32 and heat injection wells 36. Extraction wells 32, heat injection wells 36, fluid injection wells 38, and/or test wells 40 may include well casings. Portions of the well casings may be perforated to allow fluid to pass into or out of the well casings. Alternatively, extraction wells 32, heat injection wells 36, fluid injection wells 38, and/or test wells 40 may include a cased portion and an uncased portion. The uncased portion may be adjacent to contaminated soil.

In some embodiments, soil remediation system 30 may be used for in situ soil remediation. In other embodiments, soil remediation system 30 may be used for ex situ soil remediation. In some soil remediation systems, extraction wells 32, heat injection wells 36, fluid injection wells 38, and/or test wells 40 may be placed substantially vertically in soil 34. In some soil remediation system embodiments, extraction wells 32, heat injection wells 36, fluid injection wells 38, and/or test wells 40 may be place substantially horizontally in soil 34.

In addition to extraction wells 32, heat injection wells 36, fluid injection wells 38, and/or test wells 40, soil remediation system 30 may include ground cover 42, treatment facility 44, vapor collection system 46, control system 48, and/or pumping units 50. Ground cover 42 may be placed over extraction wells 32, heat injection wells 36, fluid injection wells 38, and/or test wells 40 to inhibit heat loss and contaminant vapor loss to the atmosphere. Ground cover 42 may also inhibit excess air from being drawn into soil 34. Ground cover 42 may include a layer of thermal insulation. Ground cover 42 may include a layer that is impermeable to contaminant vapor and/or air. The impermeable layer may include, but is not limited to, metal sheeting and/or concrete. Wells positioned substantially vertically in the soil may be welded or otherwise sealed to the metal sheet. Wells positioned substantially horizontally in the soil may be positioned beneath the metal sheet. Vertical barriers may be inserted into the soil around a perimeter of the metal sheet to form an end barrier. Thermal insulation may typically be placed above the impermeable barrier. The thermal insulation may include, but is not limited to, mineral or cotton wool, glass wool or fiberglass, polystyrene foam, or aluminized mylar.

Optional surface heaters may be placed on or below ground cover 42. The surface heaters may inhibit contamination from condensing on ground cover 42 and flowing back into soil 34. The surface heaters are typically electrically powered heaters.

A gas and water barrier of ground cover 42 may be placed over the remediation site. The gas and water barrier may be plastic sheeting. Any openings or connections to equipment may be sealed with a silicone or other type of sealant.

Ground cover 42 may not be needed if the contamination is so deep within soil 34 that heating the soil and removing off-gas from the soil will have negligible effect at ground surface 52 of the soil. If a cover is not utilized, a vacuum source may be needed to draw a vacuum around wellheads 54 of heat injection wells and/or extraction wells to inhibit release of vapor to the atmosphere from the wells. Wellhead 54 is equipment and/or structure attached to an opening of a well.

Treatment facility 44 may include vacuum system 56 that draws an off-gas stream from soil 34 through extraction wells 32. If the soil remediation system includes surface heaters, vacuum system 56 may be configured to draw vacuum at ground surface 52 as well as in extraction wells 32. The vacuum drawn in extraction wells 32 may be stronger than the vacuum drawn at surface 52. Treatment facility 44 may also include contaminant treatment system 58 for treating contaminants within the off-gas. Contaminant treatment system 58 may eliminate contaminants from the off-gas stream, reduce contaminants to acceptable levels, and/or concentrate contaminants for off-site transport. Contaminant treatment system 58 may include, but is not limited to, separators, condensers, reactor systems, mass transfer systems, and chemical storage vessels.

Figure 3:
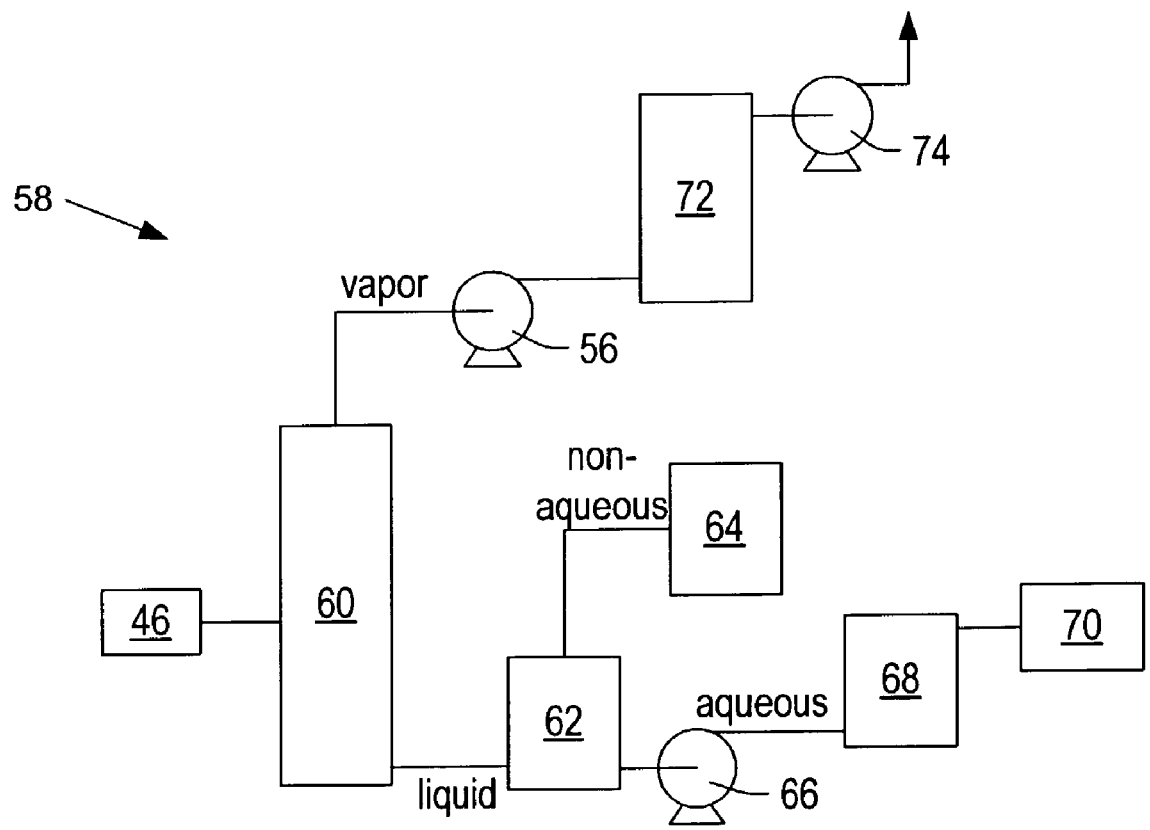
FIG. 3 shows a schematic view of an embodiment of a treatment system for processing off-gas removed from soil.

FIG. 3 shows an embodiment of treatment system 58. Off-gas from vapor collection system 46 may pass into separator 60. Separator 60 may separate the off-gas into a liquid stream and a vapor stream. Vacuum system 56 that is in-line with the vapor stream may provide the vacuum to soil 34 to remove off-gas from the soil. Vacuum system 56 should be capable of pulling a vacuum appropriate for the particular combination of soil permeability and extraction wells within a treatment system. Vacuum system 56 may be able to pull a vacuum in the range of 0.01 atmospheres to slightly less than 1 atmosphere. The vacuum system may be a water sealed pump.

Liquid and vapor streams may be processed by treatment system 58 to reduce contaminants within the streams to acceptable levels. Monitoring equipment may determine the quantity of contaminants in processed streams. The monitoring equipment may sound an alarm and/or begin recirculation of output streams from treatment system 58 back to the beginning of the treatment system if too much contamination is detected in the output streams.

A liquid stream may be separated by second separator 62 into a non-aqueous stream and an aqueous stream. In an embodiment, second separator 62 and separator 60 may be a single unit. The non-aqueous stream may include oils and other non-aqueous material. The non-aqueous stream may be very small compared to the aqueous stream. The non-aqueous stream may be sent to treatment unit 64. Treatment unit 64 may place the non-aqueous stream in storage containers, such as waste barrels. The containers may be transported off-site for disposal. Alternatively, treatment unit 64 may be an oxidization system, thermal system, or other reaction system that eliminates or reduces to acceptable levels contaminants within the non-aqueous stream.

Pump 66 may be used to move the aqueous stream. Pump 66 may transport the aqueous stream through activated carbon bed 68. Activated carbon bed 68 removes contaminants from the aqueous stream. The remaining aqueous stream may then be discharged. For example, after the aqueous stream has passed through activated carbon bed 68, the aqueous stream may be sent to sanitary sewer 70.

The vapor stream from separator 60 may pass through treatment unit 72. Treatment unit 72 may be a mass transfer system such as activated carbon bed, a reactor system such as a thermal oxidizer, or a combination thereof. Blower 74 may draw the vapor stream through treatment unit 72 and vent the remaining vapor to the atmosphere.

In some embodiments of treatment systems 58, the treatment systems may not include thermal oxidizers to eliminate or reduce contaminants within off-gas to acceptable levels. Carbon beds, concentrators, or non-thermal reactor systems may be used instead of thermal oxidizers. Replacement of thermal oxidizers with other equipment that eliminates or reduces contaminants may lower capital costs, transportation costs, and/or operation costs of a soil remediation system. A thermal oxidizer may be very expensive to obtain and to transport to treatment locations. Also, thermal oxidizers may require on-site monitoring by operational personnel to ensure that the thermal oxidizer is functioning properly. Removing a thermal oxidizer from a soil remediation process may significantly improve economics of the process.

As shown in FIG. 1, vapor collection system 46 may include a piping system that transports off-gas removed from soil 34 to treatment facility 44. The piping system may be coupled to vacuum system 56 and to extraction wells 32. In an embodiment, the piping may be un-heated piping and/or un-insulated piping. Off-gas produced from the soil may initially rise vertically and then travel downward to the treatment facility. The initial rise and subsequent downward travel may allow any condensed off-gas to pass to a liquid trap or to a separator of the treatment system without blocking lines of the collection system. In alternative embodiments, the piping may be thermally insulated and/or heated. Insulated and heated piping inhibits condensation of off-gas within the piping. Having a non-insulated and non-heated collection system may greatly reduce cost, installation time, and complexity of a soil remediation system.

Control system 48 may be a computer control system. Control system 48 may monitor and control the operation of treatment facility 44. If vapor collection system 46 includes heated piping, control system 48 may control power applied to line tracers that heat the piping. If extraction wells 32 or heat injection wells 36 include non-self regulating heater elements, the control system may control power applied to heater elements of the extraction wells.

Heat may be applied to soil 34 during a soil remediation process. Heat may be applied to soil from heat injection wells 36, from extraction wells 32, and/or from other heat sources. Heat may be applied to soil 34 from electrical resistance heater elements positioned within the extraction wells. Power may be supplied from power source 76 to extraction wells 32 and heat injection wells 36 through cables 78. Power source 76 may be a transformer or transformers that are coupled to high voltage power lines. In some embodiments of soil remediation systems, heat may be applied to the soil by other heat sources in addition to or in lieu of heat being applied from electrical resistance heater elements. Heat may be applied to soil, but is not limited to being applied to soil, by combustors, by transfer of heat with a heat transfer fluid, by radio frequency or microwave heating, and/or by soil resistivity heating.

Extraction wells 32 depicted in FIG. 1 are heater/vapor extraction wells. Heat generated by electrical resistance heaters within extraction wells 32 apply heat to soil and to fluids being produced. Heat generated by heater elements within extraction wells 32 flows countercurrent to mass flow of off-gas within soil 34. The countercurrent flow of heat and mass may allow the off-gas to be exposed to high temperatures adjacent to and in extraction wells 32. The high temperatures may destroy a significant portion of contaminants within the off-gas. In other embodiments of soil remediation systems, some of the extraction wells, or all of the extraction wells, may not include heater elements that heat the soil.

In some soil remediation system embodiments, heat may be applied to the soil only from heater/vapor extraction wells. In other embodiments, such as the embodiment depicted in FIG. 1, only selected wells within the soil are heater/vapor extraction wells. Using only some heater/vapor extraction wells may significantly reduce cost of the soil remediation system. Heater/vapor extraction wells are typically more expensive than heater wells. Installation and connection time for heater/vapor extraction wells is typically more expensive and longer for heater/vapor extraction wells than for heater wells. A vapor collection system may need to be much more extensive, and thus more expensive, for a soil remediation system that uses exclusively heater/vapor extraction wells.

In some embodiments of soil remediation systems, heat may be provided to soil 34 from heat injection wells 36 and/or from extraction wells 32. Heat injection wells 36 are not coupled to vacuum system 56. Superposition of heat from heater elements of heat injection wells 36 and/or extraction wells 32 may allow a temperature of soil 34 within a treatment area to rise to a desired temperature that will result in remediation of the soil. Extraction wells 32 may remove off-gas from soil 34. The off-gas may include contaminants and/or reaction products of contaminants that were within soil 34.

Extraction wells 32 and heat injection wells 36 may be placed in desired patterns within soil 34 that is to be remediated. The patterns of extraction wells 32 and heat injection wells 36 may be, but are not limited to, triangular patterns (as shown for extraction wells 32), rectangular patterns, pentagonal patterns, hexagonal patterns (as shown for heat injection wells 36), or higher order polygon patterns. An actual soil remediation system will typically have many more wells within a treatment area than depicted in the schematic representation of FIG. 1. The well patterns may be regular patterns to promote uniform heating and off-gas removal throughout a treatment area. For example, well patterns may be equilateral-triangle patterns or square-well patterns. Extraction wells 32 and heat injection wells 36 of the patterns may be substantially uniformly placed throughout a treatment area. Some of extraction wells 32 and/or heat injection wells 36 may be offset from the regular patterns to avoid obstacles in or on the soil. Obstacles may include, but are not limited to, structures; impermeable, uncontaminated regions amid contaminated soil; property lines; and underground or above ground pipes or electrical lines. Spacing between centers of wells may range from about 1 m to 13 m or more. Spacing may be determined based on time allowable for remediation, soil properties, type of soil contamination and other factors. A close well spacing may require less heating time to raise soil temperature to a desired temperature, but close well spacings require many more additional wells to heat the soil than would be required with a larger well spacing.

Some soil remediation systems may include fluid injection wells 38. Fluid injection wells 38 may be used to introduce a fluid into soil 34. The fluid may be, but is not limited to, a reactant, a biological agent, and/or a flooding agent. The fluid may be injected into soil 34 by pumping units 50. Alternatively, vacuum applied to extraction wells 32 may draw fluid into soil 34 from fluid injection wells 38.

Some soil remediation systems may include test wells 40. Fluid samples may be withdrawn from test wells 40 to allow determination of the progress of soil remediation at selected locations and at selected times. Monitoring equipment may be positioned in test wells 40 to monitor temperature, pressure, chemical concentration, or other properties during a soil remediation process.

FIG. 2 depicts a representation of soil remediation system 30 that uses only heater/vapor extraction wells as extraction wells 32. Power source 76 that heats the heater elements within extraction wells 32 may be a three phase transformer. For example, power source 76 may be a 112.5 kVA transformer that has a 480 VAC 3-phase primary and a 3-phase secondary. Each phase may be used to power a group of extraction wells 32 that are electrically connected in series. If more than three groups of extraction wells 32 are needed to process a treatment area, sections of the area may be sequentially treated, or additional power sources may be used so that the entire treatment area is processed at one time. Extraction wells 32 may be directly coupled to power source 76 without the use of well controllers if the heater elements are made of metals having self-regulating temperature properties. The heater elements of extraction wells 32 and power source 76 are designed to reach a desired temperature when connected to the power source. Heater elements may be designed to heat to a maximum temperature of about 1250° C. Heater elements may be designed to have a steady state operating temperature of about 900° C. An operating range of heater elements may extend from ambient soil temperature to about 1250° C.

Off-gas drawn from soil 34 by vacuum may pass through hoses 80 and vacuum manifold 82 to a treatment facility 44. Hoses 80 and vacuum manifold 82 may be components of vapor collection system 46. Hoses 80 may attach to vacuum casings of extraction well 32 and to vacuum manifold 82. The vacuum casing may extend through covering 42 and may rise to a height sufficient to allow the remainder of the vapor collection system 46 to slope downwards to treatment facility 44. Sealant such as welds, silicone rubber sealant, or other types of sealant may be used to seal casings of extraction wells 32 and other structures that pass through covering 42 to the casing. Seals may inhibit vapor and/or liquid from passing into or out of covering 42.

Hose 80 may be attached to each extraction well casing and to vacuum manifold 82 by solvent glue and/or clamps, or by other attachment methods including, but not limited to, threading or flanges. Hoses 80 may be formed of high temperature rubber that has an upper working temperature limit of about 230° C. Hoses 80 are conduits for transporting off-gas from extraction wells 32 to vacuum manifold 82. Off-gas passing through hose 80 has a residence time within the hose. Hose 80 may have a sufficient length so that the residence time of off-gas within the hose is sufficiently long to allow the off-gas to cool. The off-gas may cool within hoses 80 to a temperature that is at or below an upper working temperature limit of the material that forms vacuum manifold 82.

Vacuum manifold 82 may be formed of plastic piping. The plastic piping may be chlorinated polyvinyl chloride (CPVC) piping or other plastic piping that has a high upper working temperature limit. The upper working temperature limit of CPVC piping is approximately 90° C. Off-gas may cool as it flows through vacuum manifold 82. Portions of vacuum manifold 82 located away from extraction wells 32 may be formed of plastic piping, such as PVC piping, that has a lower working temperature limit than CPVC piping.

The use of a collection system including hoses 80 and plastic piping vacuum manifold 82 may result in lower costs, simplified on-site construction, and lower mobilization costs as compared to a metal piping collection system. A collection system including hoses and plastic piping may not be insulated and/or heated, thus greatly reducing the cost, installation time, and operating cost of the collection system. Hose 80 may be rolled into coils for transportation. Plastic piping may be purchased locally near the site. Hose 80 and plastic piping are easily cut to size on-site and are connectable by solvent gluing or other techniques. Also, hose 80 and plastic piping are lightweight and do not require machinery to lift and position during installation. Unlike some metal piping, hose 80 and the plastic piping may be highly resistant to corrosion caused by the off-gas. For example, off-gas may include hydrogen chloride, especially if the soil contamination includes chlorinated hydrocarbons. If the hydrogen chloride forms hydrochloric acid with condensed water, the acid may rapidly corrode metal vapor collection piping. Hose 80 and plastic piping may be highly resistant to HCl corrosion.

Figure 4:
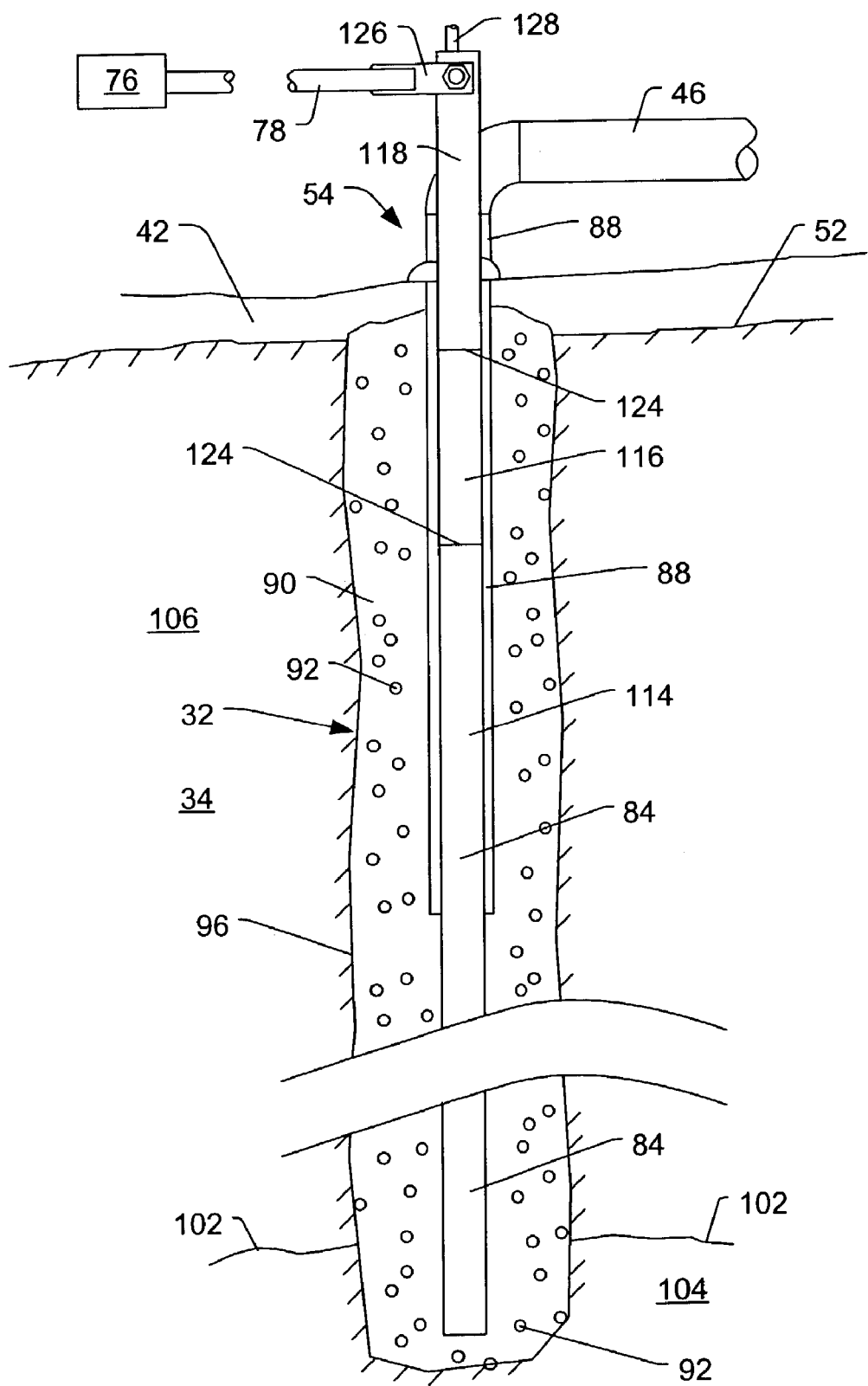
FIG. 4 depicts a side representation of an embodiment of an extraction well inserted into soil.
Figure 5:
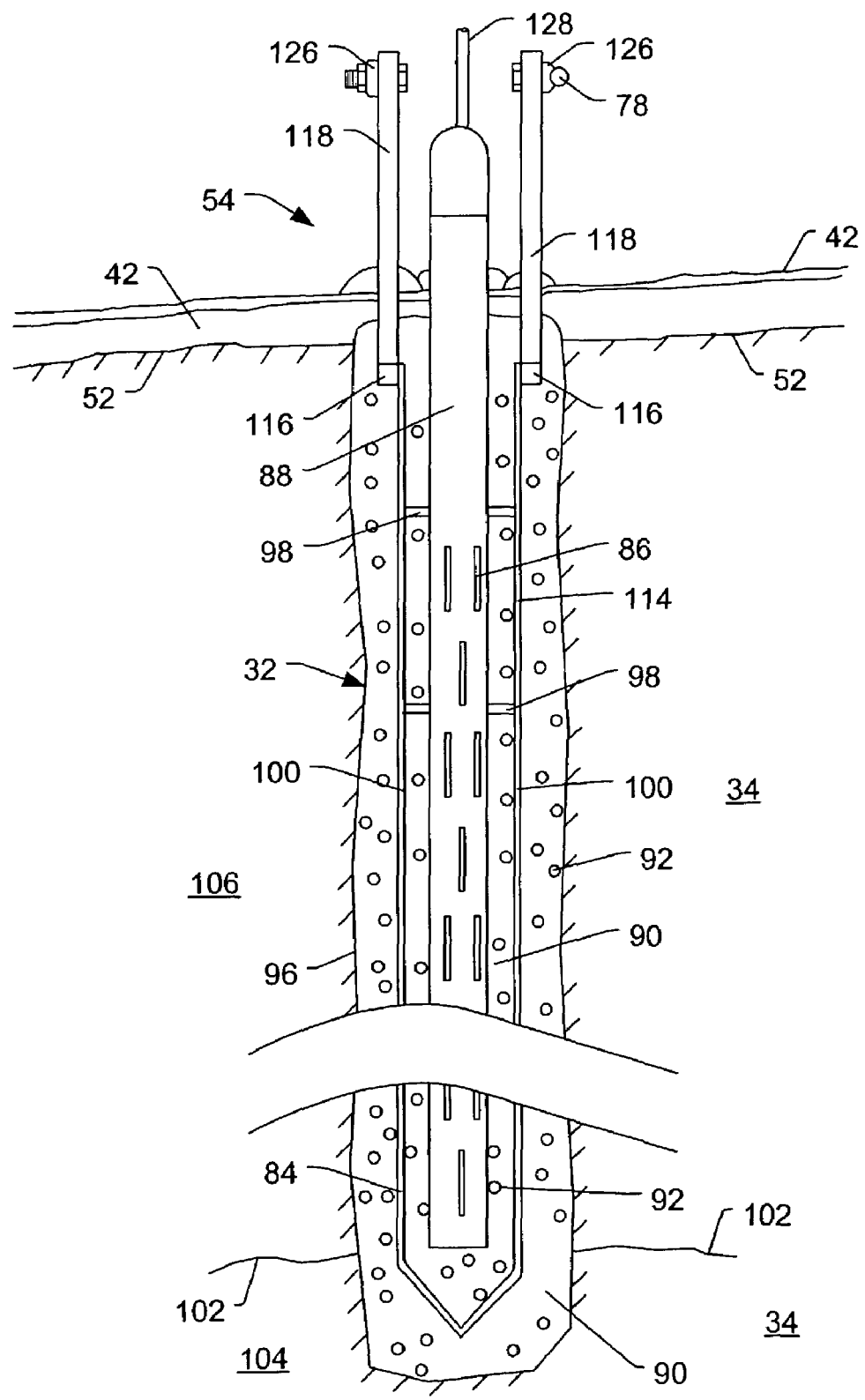
FIG. 5 depicts a front representation of an embodiment of an extraction well inserted into soil.
Figure 6:
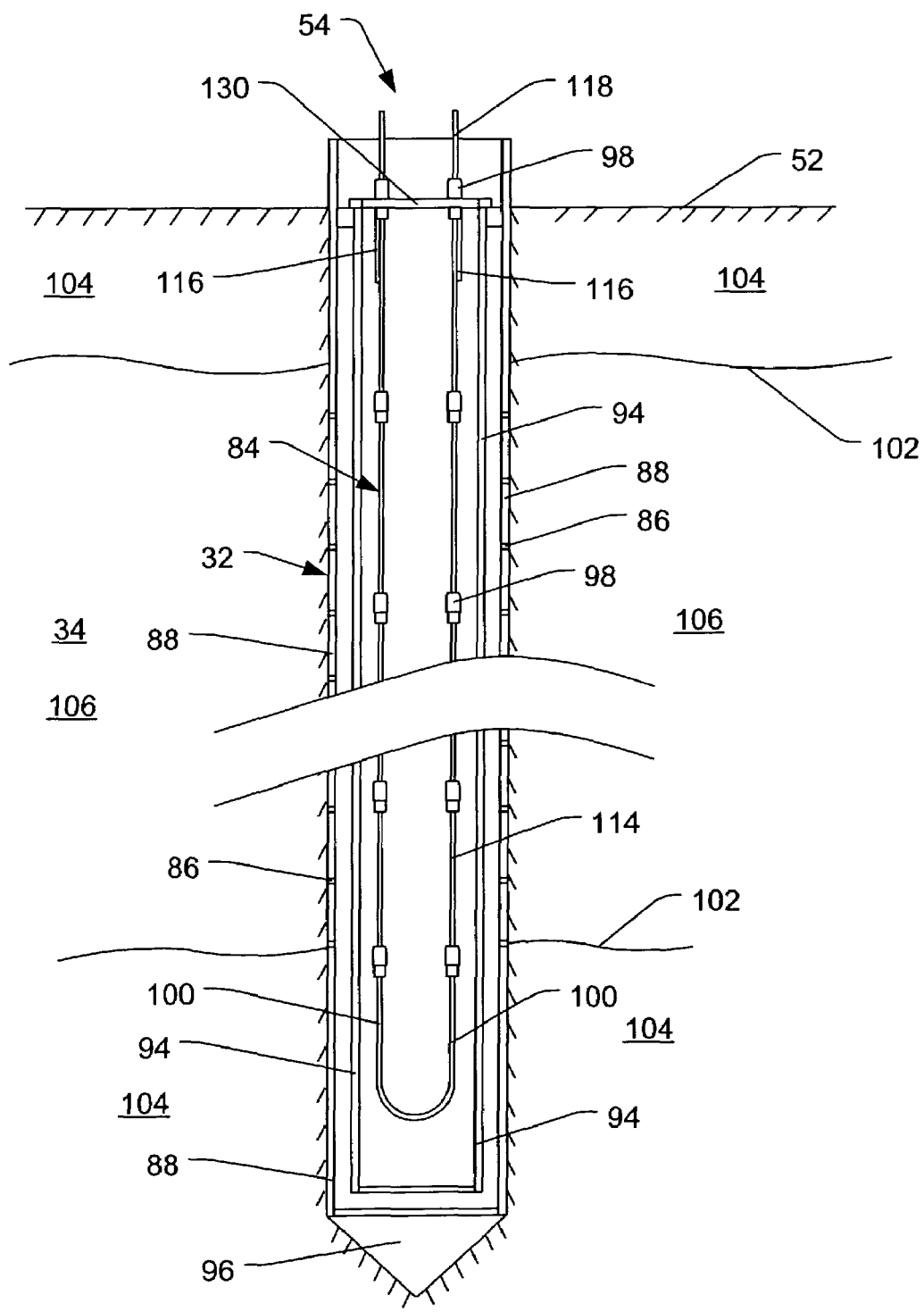
FIG. 6 depicts a representation of an embodiment of an extraction well with a radiant heater element.

FIGS. 4, 5, and 6 depict embodiments of extraction wells 32 that include heater elements 84. Heater elements 84 may be bare metal without an insulation coating such as mineral insulation. Using uninsulated, bare metal heater elements may significantly reduce heater cost as compared to conventional heater elements, such as mineral insulated cables. Heater elements 84 may be placed in soil 34 without being tied to a support member such as a conduit or a support cable. Eliminating a support cable or conduit reduces cost, installation time, and labor associated installing the heater element. An electrical current may be passed through heater elements 84 to resistively heat the heater elements.

A vacuum system may remove off-gas from soil 34 through openings 86 in vacuum casing 88. FIGS. 4 and 5 depict embodiments of extraction wells that conductively heat soil 34. Heater elements 84 shown in FIGS. 4 and 5 heat packing material 90 that conducts heat to adjacent soil. Packing material 90 may be sand, gravel, or other fill material that may be subjected to high temperatures. The fill material may include catalyst 92. Catalyst 92 may be a metal, metal oxide, or other type of catalyst that enhances pyrolysis and/or oxidation of contaminants that pass through the packing material. In an embodiment, the catalyst is alumina.

Heater elements that are packed with fill material in the soil may thermally expand towards the surface when heated. Allowance needs to be made at wellheads to allow for expansion of the heater elements.

FIG. 6 depicts an embodiment of extraction well 32 that includes heater elements that radiatively heats heater well casing 94. The inner surface of heater casing 94 may be blackened, textured, oxidized, or otherwise treated to increase radiative heat transfer between heater element 84 and the heater casing. Heater well casing 94 may radiatively heat vacuum casing 88. The inner surface of the vacuum casing may be blackened, textured, oxidized, coated, or otherwise treated to increase radiative heat transfer between the heater casing and the vacuum casing. Alternatively, annular space between the heater casing and the vacuum casing may be filled with packing material. The packing material may include a catalyst that enhances pyrolysis or oxidation of contaminants that pass through the packing material.

Heater well casing 94 may prevent current leakage into soil 34 as may occur with heater elements that do not have casings. Some current leakage may be acceptable because the current leakage may heat water or soil that is drawing current from the heater elements. If excessive current leak is possible, an external casing may be used to surround the heater element. Heater well casing 94 may be used when the well is to be positioned in a water saturated zone or in soil that has a high salt content or contains brackish water.

Heater elements 84 that radiatively heat heater well casing 94 or soil 34 may expand downwards when heated. Heater well casing 94 or the opening in the soil defined by opening wall 96 that the heater element is placed in should be sufficiently long to accommodate thermal expansion of heater element 84 and heater well casing 94.

As depicted in FIG. 6, spacers 98 may be placed along a length of heater element 84 to prevent the heater element from contacting, or electrically arcing, to an adjacent conduit such as heater well casing 94. Spacers 98 may also prevent leg 100 of heater element 84 that is bent into "U" shapes from contacting, or electrically arcing, to an adjacent leg of the heater element. Spacers 98 may be made of ceramic insulators. For example, spacers may be made of high alumina ceramic insulation material. Spacers 98 may be obtained from Cooper Industries (Houston, Tex.). Spacers 98 may slide onto heater elements 84. A weld bead may be formed beneath a place where spacer 98 is to be located so that the spacer cannot pass the weld bead. In an embodiment of a heater element that is vertically positioned in a well, as depicted in FIG. 6, spacers 98 may be positioned about every ⅓ m to about every ½ m along a length of the heater element. Shorter or longer spacings may be used to accommodate particular heater elements and system requirements. Horizontally oriented heater elements placed within heater well casings may require closer spacings to inhibit sagging of the heater element when the heater element is heated. Spacers 98 may also be positioned between vacuum casing 88 and/or soil and heater element 84 that conductively heats fill material 90, as depicted in FIG. 5.

Figure 7:
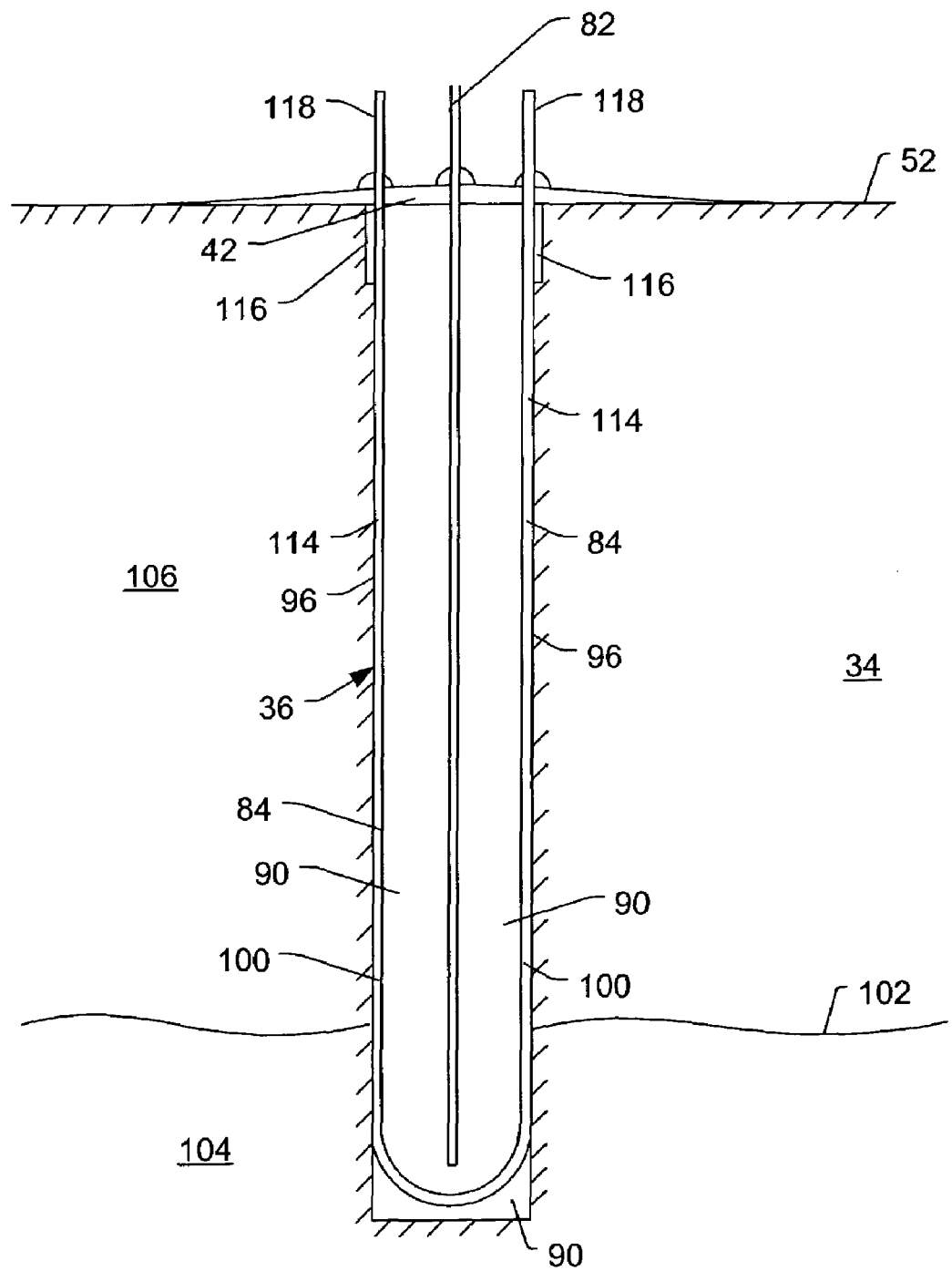
FIG. 7 depicts a representation of an embodiment of a heat injection well that conductively heats soil.
Figure 8:
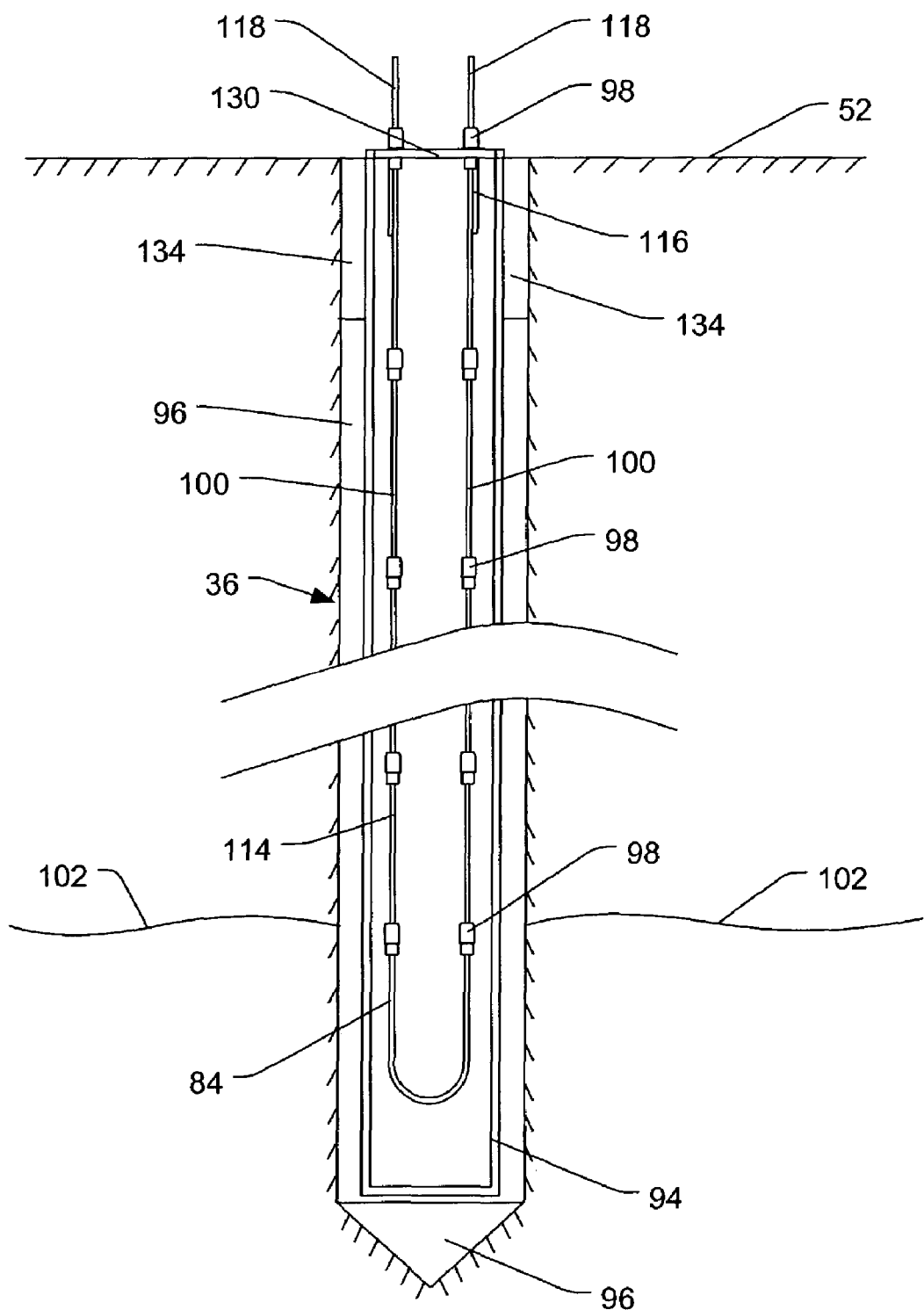
FIG. 8 depicts a representation of an embodiment of a heat injection well positioned within a casing.
Figure 9:
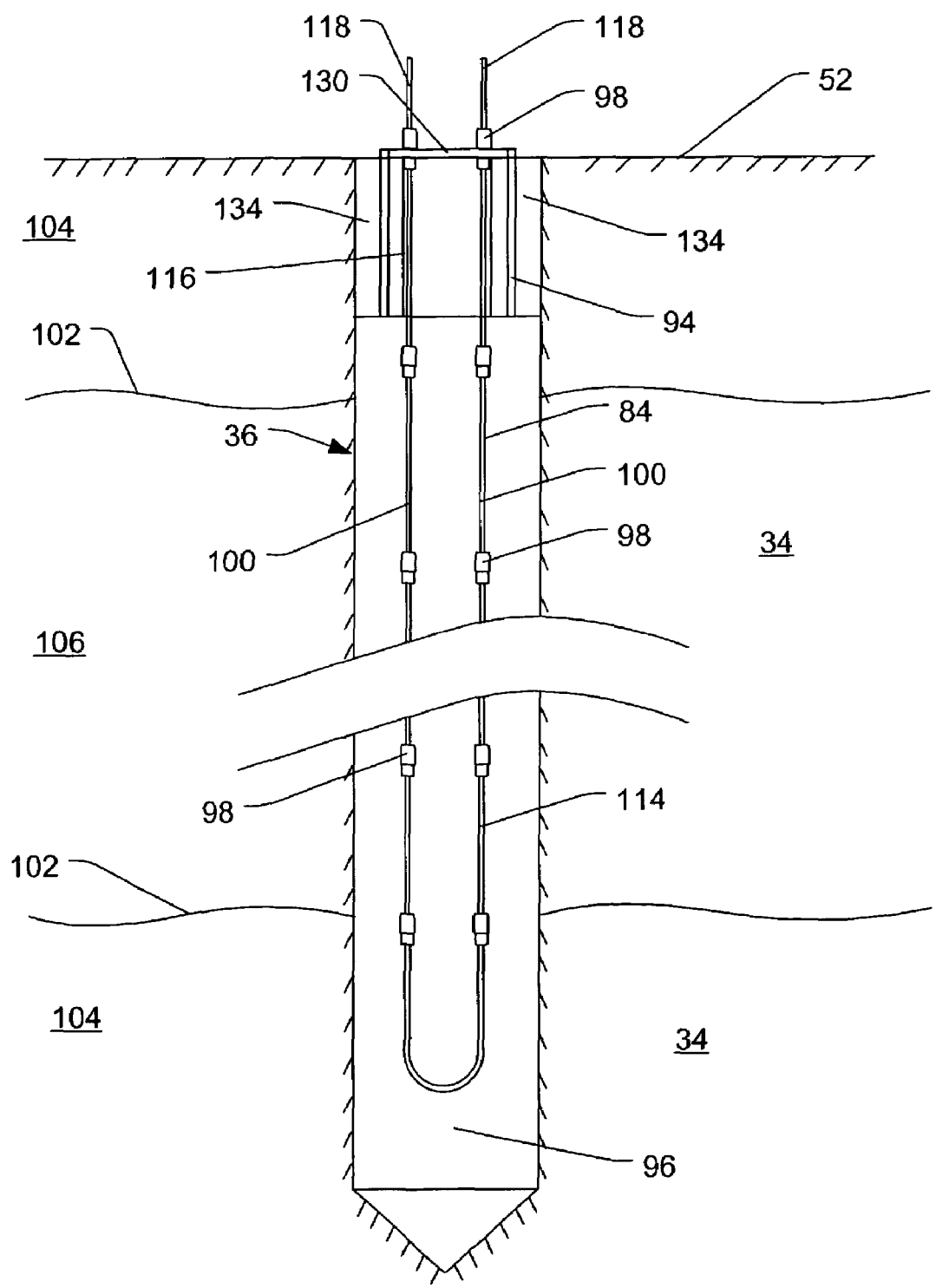
FIG. 9 depicts a representation of an embodiment of a heat injection well that radiatively heats soil.

FIGS. 7, 8, and 9 depict embodiments of heat injection wells 36. Heat injection wells 36 include heater elements 84. An electrical current may be passed through the heater elements 84 to resistively heat the heater elements. FIG. 7 depicts an embodiment of a heat injection well 36 having heater element 84 that conductively heats soil 34. FIG. 8 depicts a heat injection well embodiment having heater element 84 that is enclosed in heater casing 94. In certain embodiments, heater casing 94 may be packed with fill material. In other embodiments, the heater casing may radiatively heat the heater casing. FIG. 9 depicts a heat injection well embodiment having heater element 84 that radiatively heats adjacent soil 34.

Figure 10:
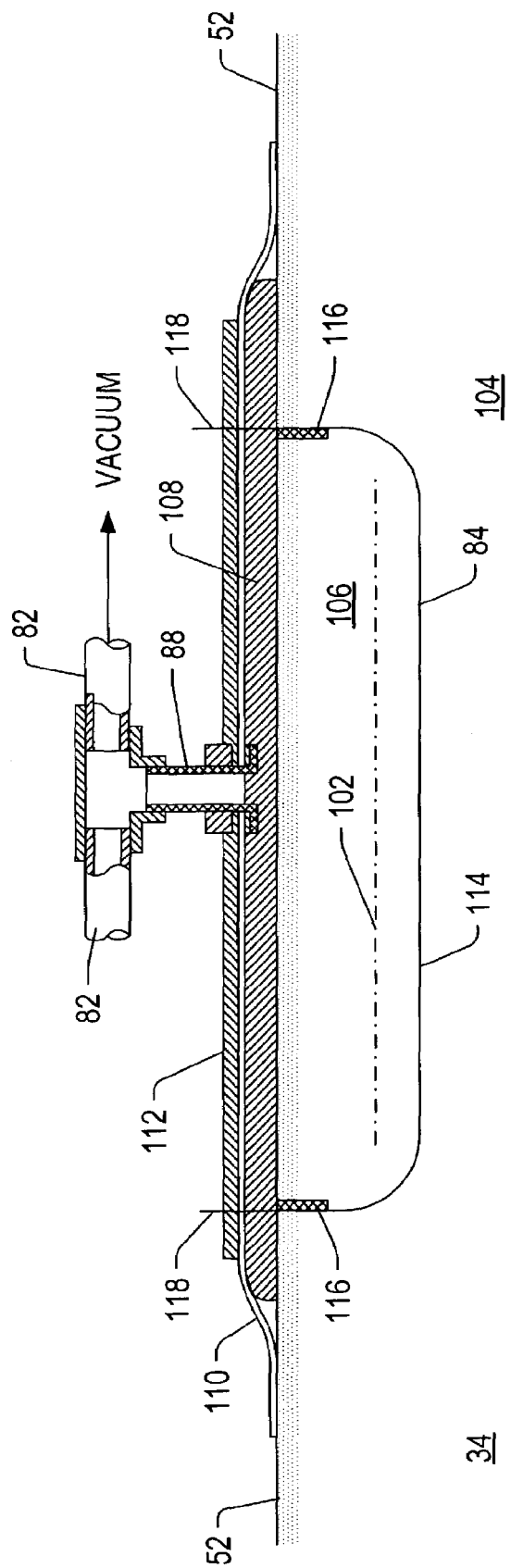
FIG. 10 depicts a representation of an embodiment of a heater element positioned within a trench.

FIG. 10 depicts a representation of an embodiment of heater element 84 positioned within a trench near to ground surface 52. Heater element 84 is shown below contamination interface 102 in uncontaminated soil 104. In other embodiments, heater element 84 may be positioned within contaminated soil 106, or at or near contamination interface 102. Heater element 84 is shown as having 90° angles to the surface. In practice, ends of the trench may taper towards the surface, and ends of heater element 84 may be positioned on the tapering ends of the trench.

Vacuum drawn by a treatment facility may be applied near soil surface 52. Permeable mat 108 may be placed on top of soil surface 52. Impermeable barrier 110 and thermal barrier 112 may be placed on top of mat 108. Mat 108 may serve as a conduit for flow beneath impermeable barrier 110. In an embodiment, mat 108 may be a thin layer of high permeability sand or other granular material. Mat 108 may include catalyst material that enhances thermal degradation of contaminants that pass through the mat. Mat 108 may allow off-gas to flow out of soil 34 to vacuum manifold 82 positioned above the mat. The off-gas may flow even when the vacuum draws impermeable barrier 110 against mat 108 and compresses the mat. Thermal barrier 112 may inhibit heat transfer. Alternatively, vapor extraction wells may be inserted into the soil throughout the treatment site to draw off-gas from the soil.

As shown in FIGS. 4-10, heater elements 84 may include heater sections 114, transition sections 116, and pins 118. Some heater elements 84 may not include transition sections between heater sections 114 and pins 118. All or substantially all of heater section 114 of heater element 84 may be bare metal. "Bare metal" as used herein refers to a metal that does not include a layer of electrical insulation, such as mineral insulation, that is designed to provide electrical insulation for heater section 114 during use. Bare metal may encompass a metal that includes a corrosion inhibiter such as a naturally occurring oxidation layer, an applied oxidation layer, and/or a film. Bare metal includes metal with polymeric or other types of electrical insulation that cannot retain electrical insulating properties at typical operating temperatures of heater section 114 of heater element 84. Such material may be placed on the metal and may be designed to be destroyed during a soil remediation process. Weld material and/or connector sections of heater sections 114 may include electrical insulation material without changing the nature of the heater element into an insulated heater element. Insulated sections of heater section 114 of heater element 84 may be less than 5%, 1%, 0.5%, or 0.1% of a length of the heater section. Bare metal heater elements 84 significantly reduce production cost and increase availability of heater elements as compared to heater elements that include insulated heater sections 114.

In certain embodiments of heater elements 84, portions of transition sections 116 and/or portions of pins 118 may be electrically insulated. In other embodiments of heater elements 84, all of the heater element may be bare metal.

Heater elements 84 depicted in FIGS. 4-10 are positioned substantially vertically or horizontally. Heater elements may be positioned at any desired orientation from 0° (horizontal) to 90° (vertical) relative to ground surface. For example, in a soil remediation system embodiment, heater elements may be oriented at about 45° to remediated soil adjacent to a geological layer that slopes at about 45°. The orientation may be chosen to result in relatively low cost, quick, and efficient soil remediation.

Heater sections 114 of heater elements 84 may be formed of metals that are capable of sustained use at high operating temperatures. Portions of heater element 84 may operate from ambient soil temperatures to sustained temperatures of over 1000° C. In certain heater element embodiments, such as the heater elements depicted in FIGS. 4, 5, 7, 9, and 10, portions, or all, of heater elements 84 may be exposed to off-gas during soil remediation. Such heater elements 84 may need to be made of corrosion resistant metal. The resistance of heater sections 114 to corrosion may be very important. High temperature and high amperage at which heater sections 114 operate may promote corrosion of heater sections 114. Corrosion may decrease cross-sectional areas of heater sections 114 at certain locations along lengths of the heater sections. Decreased cross-sectional areas of heater sections 114 may cause the heater sections to overheat and fail.

Heater sections 114 may be formed of stainless steel. The stainless steel may be, but is not limited to, type 304 stainless steel, type 309 stainless steel, type 310 stainless steel, or type 316 stainless steel. Heater sections 114 may also be formed of other metals including, but not limited to, Nichrome®, Incoloy®, Hastelloy®, or Monel®. For example, heater section 114 may be made of Nichrome® 80 or Incoloy® 800.

A specific metal used to form heater section 114 of heater element 84 may be chosen based on cost, temperature of the soil remediation process, electrical properties of the metal, physical properties of the metal, and chemical resistance properties of the metal. For example, 310 stainless steel is a high temperature stainless steel that may dissipate about 20% more power than 304 stainless steel of equivalent dimensions. The corrosion resistance of 310 stainless steel is better than the corrosion resistance of 304 stainless steel. The upper working temperature limit of 310 stainless steel is about 160° C. higher than the upper working temperature limit of 304 stainless steel.

The extra temperature range of 310 stainless steel may be used to dissipate extra heat into soil and shorten remediation time. The extra temperature range may be used as a safety margin to insure against overheating the heater element. A cost of 310 stainless steel may be about 25% more than a cost of 304 stainless steel. At a design stage of a soil remediation process, a determination may be made of whether the better characteristics of 310 stainless steel justify the extra cost of the 310 stainless steel above the cost of 304 stainless steel. Similar comparisons may be made for other metals as well.

Figures 11, 12:
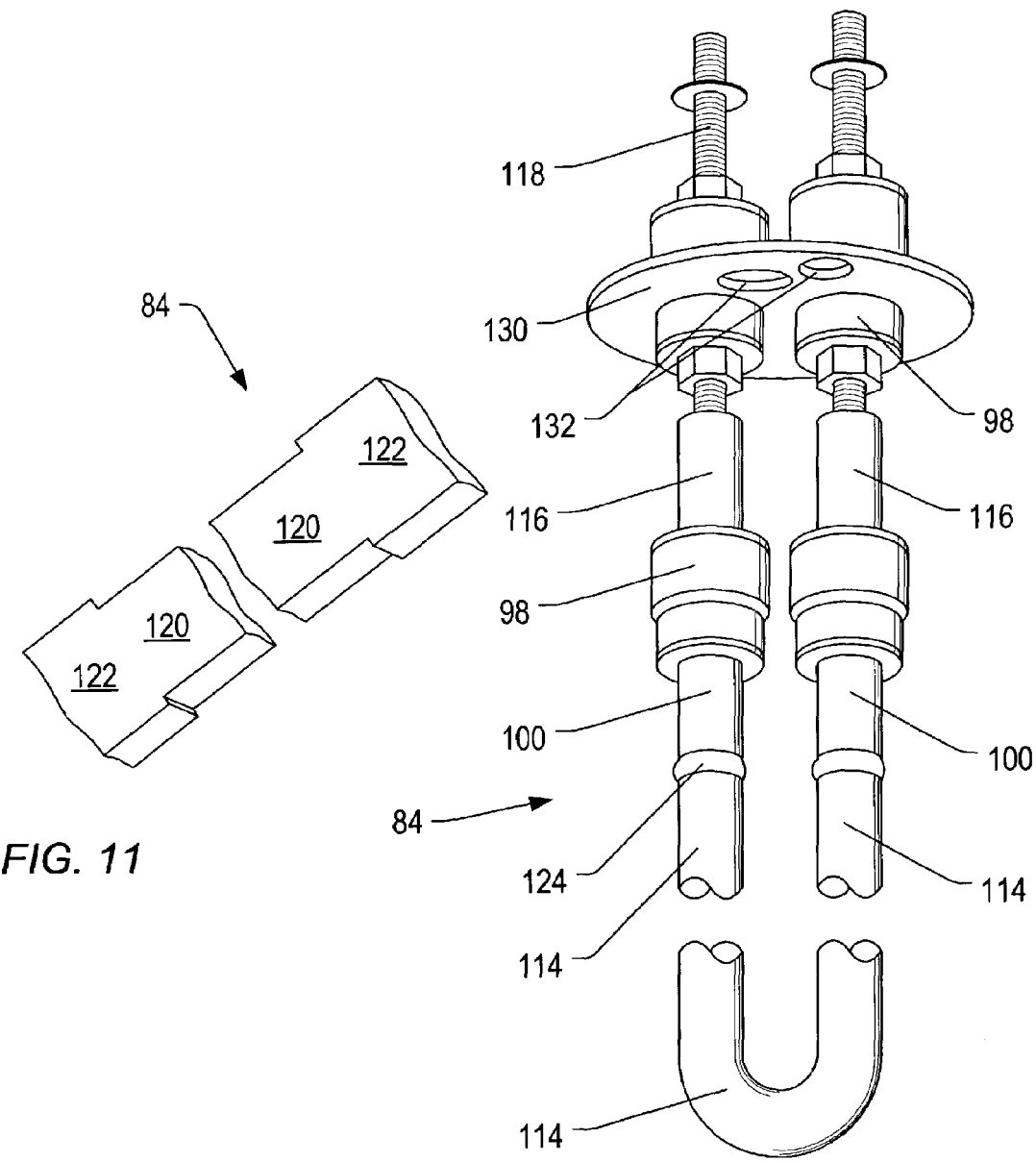
FIG. 11 is a perspective view of a portion of a heater element that has a varying cross-sectional area.
FIG. 12 is a perspective view of an embodiment of a heater element.

Heater sections 114 of heater elements 84 may be formed to have selected sections that heat to higher or lower temperatures than adjacent sections of heater elements. Portions of heater element 84 that are configured to heat to higher temperatures than adjacent portions may be positioned adjacent to interfaces 102 between contaminated soil 106 and uncontaminated soil 104. The extra temperature produced in the high temperature portions may help to counter heat loss due to end effects of heater section 114. High temperature portions may dissipate greater than 5%, 15%, 25%, or 30% more heat than adjacent portions of the heater section. FIG. 11 shows a portion of heater element 84 having a high temperature portion that is reduced cross-sectional area portion 120 positioned adjacent to larger cross-sectional area portions 122. Metal may be removed from a portion of heater section 114 to form a high temperature portion of heater section 114. Alternatively, the portions of a heater section that are to be heated to higher temperatures than adjacent areas may be portions of a different metal that is more electrically resistive than the metal of the adjacent sections. The more resistive metal may have a larger, same, or smaller cross-sectional area than adjacent portions of the heater section. Thermally and electrically conductive weld material may be used to couple portions 120, 122 together. Care may be taken to ensure that ends of the different metals abut and that a large amount of weld material couples the different metal portions together. Abutting metal portions and a large amount of weld material may ensure that failure due to arcing and/or corrosion does not occur at junctions between the metals during use.

Portions of heater sections 114 may heat to lower temperatures than surrounding portions. Such portions may be positioned adjacent to soil layers or obstacles that do not need to be heated to high temperatures. For example, a reduced heating section may be designed to reside adjacent to an impermeable, uncontaminated soil layer that is between two contaminated soil layers. A low heating section may be formed of a heating section having increased cross-sectional area as compared to adjacent areas. Alternatively, a low heating section may be formed of a less electrically resistive metal welded between two adjacent portions of heater section. Care may be taken to ensure that ends of the different metals abut and that a large amount of weld material couples the different metal portions together. Thermally and electrically conductive weld material may be used to couple the portions together. Abutting metal portions and a large amount of weld material may ensure that failure due to arcing and/or corrosion does not occur at junctions between the portions during use.

As shown in FIG. 10, transition sections 116 of heater element 84 may be welded to each end of heater section 114 of the heater element. Pins 118 may be welded to transition sections 116. Transition section 116 may reduce a temperature of heater element 84 so that the temperature at and adjacent to pin 118 is sufficiently cool to allow use of insulated connector cable 78 (depicted in FIG. 4) to couple pin 118 to power source 76. Transition section 116 may be made of the same material as heater section 114, but the transition section may have greater cross-sectional area. Alternatively, the transition section may be made of a material having less electrical resistance than the heater section. The two sections may be welded together.

FIG. 12 depicts an embodiment of heater element 84 that may be used to radiatively heat soil. Heater element 84 includes welds 124 between transition section 116 and heater section 114. Thermally and electrically conductive weld material may be used to couple sections 114, 116 together. Abutting metal sections and a large amount of weld material may ensure that failure due to arcing and/or corrosion does not occur at a junction between the sections during use.

Pins 118 may be nickel pins. In an embodiment, such as the embodiment depicted in FIG. 4, pins 118 extend through ground cover 42 when heater element 84 is inserted into the soil 34. Connection 126 may electrically couple the pin to cable 78. Connection 126 may be a mechanical Kerney lug, epoxy canister, or other type of electrical connector. Cable 78 may be electrically coupled to power source 76. Cable 78 may be an electrically insulated cable. Transition section 116 and cold pin 118 may allow heater element 84, soil 34, and/or cover 42 to be cool enough to inhibit thermal degradation of the cable insulation during use.

In certain embodiments, long sections of relatively low resistance metal may be attached to heater sections to form long heated sections that generate temperatures sufficient to inhibit condensation of vapor on or adjacent to the heater element. The low resistance metal may be, but is not limited to, nickel or alloys of nickel and copper such as Alloy 30. The long heated sections may be needed for deep soil contamination that does not come close to the ground surface.

Power source 76 (depicted in FIG. 1) for a soil remediation system may provide a substantially constant voltage to heater elements of the soil remediation system. Power source 76 may be electrical power from a power line that passes through a transformer. Output from the transformer may be coupled to a number of heater wells by parallel and/or series connections to provide an appropriate electrical circuit that will heat soil to a desired temperature.

Heater section 114 of heater element 84 may have a large cross-sectional area as compared to conventional radiant heater elements. The large cross-sectional area may allow heater element 84 to have a small electrical resistance as compared to a conventional heater of equivalent length. The small electrical resistance may allow heater element 84 to be long. A heater element may be over 10 m, 50 m, or 100 m long, 300 m, 500 m or 600 m long. The small electrical resistance may also allow several heater elements to be electrically connected in series. The ability to connect several heater elements 84 in series may greatly simplify wiring requirements of a soil remediation system. For heater elements that conductively heat adjacent material, the large cross-sectional area of the heater section may mean that there will be a large contact area between the heater section and adjacent material. For heater elements that radiatively heat adjacent material, the large cross-sectional area of the heater may mean that the heater section has a large surface area that will radiate heat to a casing wall or to soil. Also, the large cross-sectional areas of heater elements may allow the heater elements to be placed in the soil without being attached to a support structure. In an embodiment of a radiative heater element, the heater element is made of 304 stainless steel rod stock having a diameter of about 1 cm.

Radiative heater elements that are suspended within a well casing may have telescoping sections of different alloys and/or different cross-sectional areas to produce long heater elements. A first section may be made of a material that has a high creep resistance at operating temperatures of the heater element. The first section may be relatively thick or have a relatively large effective diameter. Many high strength, high creep resistance materials, such as Inconel 617 and HR 120, have higher electrical resistances than stainless steels that may be used to form primary heater sections of the heater element. Higher resistance material allows the high strength and creep resistant sections (one on each leg of a "U" shaped heater element) to heat to high temperatures even though the sections have large cross-sectional areas. A second section may be made of a less expensive metal that is welded to the first metal. The second section may have a smaller thickness or effective diameter than the first section. Additional sections may be welded to the strip to form a heater element having a desired length. The diameters of the various metals, taking into consideration the resistivity of the metals, may be adjusted to produce a long heater element that dissipates substantially the same amount of energy per unit length along substantially the entire length of the heater. Metals used to form the sections may include, but are not limited to Inconel 617, HR 120, 316 stainless steel, 310 stainless steel, and 304 stainless steel. In an embodiment of a long, radiative, suspended heater element, a lead in section of about 30 m is made of 316 stainless steel and is used to suspend the heater element from a wellhead. The lead in section functions as a heater section of the heating element. A second heater section may be formed of a narrower cross-sectional area of 304 stainless steel (up to about 25% less cross-sectional area to dissipate the same amount of heat as the lead in section). The second heater section in the particular embodiment is 160 m in length, resulting in a "U" shaped heater element having a 110 m (30 m+80 m) long heating section with a total heater section length of 220 m. A portion of the second heater section near a 180° bend (or hairpin turn) in the heater element may have a further reduced cross-sectional area or a different alloy metal to dissipate more heat than adjacent heater element sections.

In certain embodiments of radiative heater elements, a support section of a radiative heater element may have a cross-sectional area that tapers to a substantially constant cross-sectional area. A support section may be made of the same material or a different material than other portions of a heater element. The support section may be a transition section of a heater element that does not need to rise to high operating temperatures. The support section may be a portion of heater section that will rise to high operating temperatures during use.

For a heater element that conductively heats adjacent material, a heater section may have a substantially rectangular cross-sectional area. For example, an embodiment of a heater section 26 has a 25 millimeter (mm) by 3 mm rectangular cross section and a length of about 6 m. The dimensions of a heater section may be chosen so that the heater section produces and dissipates a desired amount of heat when inserted into soil and when coupled to a power source. Cross-sectional shapes other than rectangular shapes may also be used. The cross-sectional shapes may be, but are not limited to, ellipsoidal, circular, arcuate, triangular, rectangular, pentagonal, hexagonal, or higher order polygon shaped. Heater elements that transfer heat by radiation may typically have a substantially circular cross-sectional area, but other cross-sectional areas, such as the cross-sectional areas referred to above, may also be used.

Heater elements may be positioned within the soil in a variety of ways. Some heater elements 84 may be directly placed within the soil, such as the embodiment of a heater element depicted in FIG. 7. Other heater element embodiments may be separated from the soil by packing material 90, such as is depicted in the embodiment of FIG. 4. Other heater elements may be placed in heater element casings 94, such as the heater element depicted in FIG. 6. Heater element casing 94 may be placed or packed in the soil, or the heater casing may be placed in vacuum casing 88 that is placed or packed in the soil. Placing heater element 84 in heater element casing 94 may allow the heater element to be made of a relatively inexpensive, non-corrosion resistant material, because off-gas will not come into direct contact with the heater element. Heater element casing 94 may be made of a material that has sufficient corrosion resistance to resist breakthrough corrosion during the estimated time needed to complete soil remediation.

Heater element 84 in FIG. 4 may be driven directly into the soil. A drive rod may be positioned at the center of heater element 84. The drive rod may then be pounded into soil 34. When heater element 84 is inserted to a desired depth, the drive rod may be withdrawn. The drive rod does not need to be a continuous rod. The drive rod may be made of threaded sections that are assembled together as the drive rod is pounded deeper into soil 34. A geoprobe or a cone penetrometer rig may be used to drive heater element 84 into soil 34. Also, a sonic rig may be used to vibrate heater element 84 to a desired depth. The sonic rig may include an eccentric cam that vibrates heater element 84 and a drive rod to a desired soil depth. Driving or vibrating heater element 84 into soil 34 may not produce cuttings as are produced when an augered opening is formed in the soil. Driving or vibrating heater element 84 may eliminate problems associated with disposing of cuttings produced during the formation of an augered hole. Avoidance of the production of cuttings may be particularly advantageous at extremely toxic or radioactive sites. Also, driving or vibrating heater element 84 into soil 34 may advantageously place a portion of heater element 84 in direct contact with the soil to be heated.

For heater elements placed in openings or well casings, heater elements 84 may be formed in "U" shapes so that ends of both legs 100 of the heater element are accessible at ground surface 52. Accessibility of both legs 100 allows many heater elements 84 to be easily and efficiently coupled together electrically. Spacers may be positioned at desired locations along a length of the heater element. The heater element may be lowered into the opening or casing. If fill material is to be used to pack the casing, as depicted in FIG. 4, fill material 90 may be placed adjacent to heater element 84. To place the fill material 90, a fill pipe, such as a polyvinyl chloride pipe, may be inserted between legs 100 of "U"-shaped heater element 84. If fill material is to be placed between legs 100 of the heater element and soil 34, tubes suspended by wire may be lowered down the legs of the heater element. The tubes may be raised as fill material 90 is placed in the opening. The tubes may properly position each leg of heater element 84. In certain embodiments, the fill pipe may press the heater element against the soil. Fill material 90 may be inserted through the fill pipe while raising the fill pipe out of soil 34. Fill material 90 may plug spaces between heater element 84 and soil 34. Fill material 90 may include sand and/or gravel. Fill material 90 may also include catalyst 92, such as aluminum oxide. Catalyst 92 may be a component of fill material for both extraction wells 32 and heat injection wells 36. Fill material 90 may be heated to remove moisture before being inserted through the fill pipe. Fill material 90 may be built up in a mound at soil surface 52 to promote water runoff away from heater element 84.

Thermocouple well 128 may be positioned in fill material 90 between legs 100 of U-shaped heater element 84. A thermocouple placed in thermocouple well 128 may be used to measure the temperature between legs 100 of heater element 84 during soil remediation. The thermocouple may be lowered or raised to determine temperatures at selected depths. Alternatively, the thermocouple may be fixed within the thermocouple well. In an embodiment depicted in FIG. 4, thermocouple well 128 is 0.64 cm diameter stainless steel tubing that is inserted into the center of a 4 cm diameter stainless steel vacuum casing 88. A thermocouple positioned within thermocouple well 128 may be used to monitor the temperature of heater element 84 adjacent to casing 88.

Dry fill material may need to be packed within a well in a substantially uniform manner. Dry fill material may need to be used to avoid formation of gaps and/or settling of the fill material when water within the fill material evaporates. If a gap exists within the fill material, a leg of the heater element may expand into the gap when the heater element expands. If a leg of a heater element expands into a gap, the leg may contact or approach the opposite leg of the heater element. If the leg contacts the opposite leg, the heater element may short and fail. If the leg approaches the opposite leg, electricity may arc to the opposite leg and cause the heater element to fail.

If heater element 84 is a radiant heating element, the heater element may include top 130 as depicted in FIG. 12. Top 130 may thread onto heater casing 94 near ground surface 52, as shown in FIGS. 6, 8, and 9, or the top may be welded to the heater casing, to form a wellhead for the heater element. If the casing is an enclosed heater casing 94, as shown in FIG. 6, the casing may be filled with a gas. In some embodiments, the gas may enhance thermal conduction between heating element 84 and casing 94 to improve heating response time during initial heating. In some embodiments, the gas may be a corrosion inhibiter. As shown in FIG. 12, top 130 may include openings 132. A fill tube may be placed in a first opening and the gas may be flowed into casing 94. Gas originally in casing 94 may flow out of the second opening. When the desired gas fills casing 94, the second opening may be plugged, the tube may be removed, and the first opening may be plugged.

If heating element 84 is to be placed in an open wellbore, as depicted in FIG. 9, cement 134 or another type of securing method or device may fix casing 94 to soil 34. Top 130 may be threaded or welded to casing 94.

Figure 13:
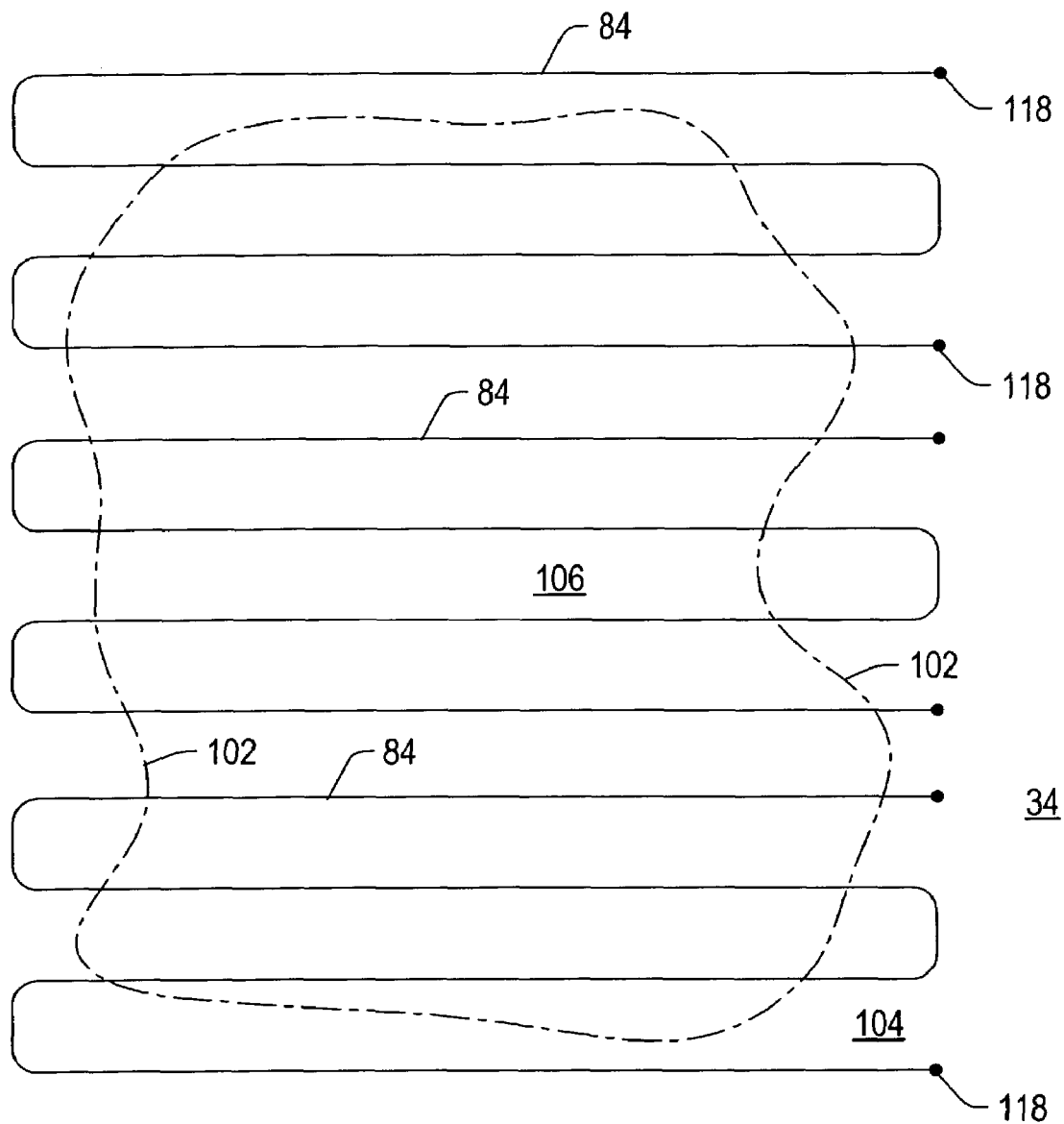
FIG. 13 depicts a schematic representation of a layout plan for heater elements placed in trenches.

FIG. 13 shows a plan view of an embodiment of a layout for heater elements 84 positioned within trenches. Heater elements 84 placed in trenches may be placed in long rows. For heater elements 84 that conductively heat adjacent material, more than one heater element may be placed in a single trench as long as a distance between heater elements, fill material, or spacers ensures that the heater elements will not touch or be close enough to each other to arc. For heater elements that radiatively heat a heater casing, more than one heater element may be placed within a single heater casing. Heater elements 84 may be placed in trenches that were formed by a trenching machine. After heater elements 84 are positioned within trenches and electrically coupled to a power source, cuttings formed when making the trench may be used to fill the trenches. A vacuum system may be installed, a cover may be placed over the treatment area, and the system may be energized. Heater elements placed in trenches may be used in ex situ applications or to treat low depth soil contamination in situ that is within about 2 m of a soil surface. Heater elements positioned in trenches may have long lengths that span across contaminated soil 106. In certain embodiments, rows of heater elements 84 may be separated by distances equal to about twice the insertion depth of the heater element into soil 34. Heater elements may be placed in casing laid in trenches and exiting at the surface, thereby allowing replacement of heater elements.

As shown in FIG. 10, heater element 84 may be placed in soil 34 so that a portion of heater section 114 is below contaminated soil 106, and a portion of the heater section is above the contaminated soil. The portion of heater section 114 below contaminated soil 106 may be 1 m or more in depth. Heating a section of uncontaminated soil 104 below contaminated soil 106 may prevent a falloff in temperature at interface 102. The cross-sectional area of heater element 84 adjacent to contamination interface 102 may be small, or may be made of a different material, so that more heat is diffused into the soil adjacent to the interface. Diffusing more heat adjacent to the interface may promote a more uniform temperature distribution throughout contaminated soil 106.

To implement a soil remediation process, such as the process depicted in FIG. 1, wells may be positioned in the soil. The wells may be installed by placing wells within drilled openings, by driving and/or vacuuming wells into the ground, or by any other method of installing wells into the soil. The wells may be extraction wells 32, heat injection wells 36, fluid injection wells 38, and/or test wells 40. A ring or rings of dewatering wells may be installed around a perimeter of the area to be treated. The dewatering wells may be operated to remove water from the treatment area and to inhibit water inflow into the treatment area. In some embodiments, extraction wells, and/or fluid injection wells (and possibly other types of wells) may be connected to dewatering pumps so that the treatment area is rapidly and efficiently dewatered.

Heat injection wells 36 and extraction wells 32 that include heater elements may be coupled to controllers (if necessary) and to power source 76 or power sources. Extraction wells 32 may be coupled to vapor collection system 46. The vapor collection system 46 may be connected to treatment facility 44. Other wells, such as fluid injection wells 38 and test wells 40, may be coupled to appropriate equipment. In some embodiments, treatment facility 44 may be engaged to begin removing off-gas from soil 34. Heat injection wells 36 and extraction wells 32 that include heater elements may be energized to begin heating soil 34. The heating may be continued until the soil reaches a desired average temperature for a desired amount of time. The desired average temperature may be slightly higher that the boiling point of a high boiling point contaminant within soil 34. A desired average temperature may be over 100° C., 400° C., 600° C., or higher. A desired amount of time may be days, weeks, months or longer. The desired amount of time should be sufficient to allow for contaminant removal from soil 34.

A remediation site may be an area at or near an original location of the contaminated soil. For ex situ applications, contaminated soil may be collected from one or more locations and transported to one or more remediation sites. Collection may include excavation and transportation using conventional earth moving equipment.

In some embodiments, contaminated soil may be arranged in long, substantially rectangular piles. A remediation site may include more than one pile of soil. For example, a remediation site may include two to four piles of contaminated soil. A pile may have a volume of about 2,000 to about 5,000 $m^3$. In an embodiment, a pile may have a height of about 3 m, a width of about 8 m, and a length of about 35 m. Alternatively, a pile may have a height of about 3 m, a width of about 25 m, and a length of about 100 m. In an embodiment, a vertical cross-sectional shape along a width of a soil pile may be substantially trapezoidal.

Heaters may be placed horizontally in a pile of contaminated soil by embedding the heaters in a portion of soil, placing the heaters in trenches formed in the soil, and/or forming layers of heaters between layers of contaminated soil. Alternatively, a heater elements may be placed in casing or tubing, at least one end of which extends to the surface to allow replacement of the heater element. In an embodiment, a first layer of soil may be placed in a pile and leveled using equipment including, but not limited to, small earthmovers, bulldozers, and front end loaders. Heaters may be placed on the soil. The heaters may be long strips of a stainless steel. Ends of the heaters may be coupled to a power source that supplies electricity to the heaters to resistively heat the heaters when initiated. Additional soil may be placed on top of the heaters and leveled. Additional heaters and soil may be installed to complete the pile. The heaters may be spaced relatively close together (e.g., about 1 m apart) to allow for rapid heating of soil in the pile. Vapor extraction wells may be placed in desired locations in the pile, and/or a vapor extraction system may be formed adjacent to the pile.

A cover may be placed over the pile, vacuum may be initiated, and heating of the soil may be initiated. The cover may be flexible to accommodate subsidence of the soil level in the pile due to vacuum and removal of material from the soil (e.g., water and contaminants).

In addition to allowing removal of contaminants from the soil, heating the soil may result in the destruction of contaminants in situ. Superposition of heat from a plurality of heaters used to radiatively and/or conductively heat soil at a treatment site may raise the temperature of the soil throughout the treatment site above temperatures that will allow for reaction of contaminants. The presence of an oxidizing agent, such as air, may result in the oxidation of contaminants that pass through the heated soil. In the absence of oxidizing agents, contaminants within the soil may be altered by pyrolysis. Vacuum applied to the soil may remove some reaction products from the soil.

Many soil formations are characterized by a relatively large weight ratio of water to contaminants within the soil. Raising the temperature of the soil to a vaporization temperature of water or above may result in vaporization of water in the soil. The water vapor may vaporize and/or entrain contaminants within the soil. Vacuum applied to the soil may remove water vapor and contaminants entrained within the water vapor from the soil. Vaporization and entrainment of contaminants in water vapor may result in the removal of medium and high boiling point contaminants from the soil.

For deep contamination, heater wells may be arranged vertically within a pile of contaminated soil to supply heat to the soil. Some heater wells may include perforated casings that allow fluid to be removed from the soil. A heater well with a perforated casing may also allow fluid to be injected into the soil. Vacuum may be applied to the soil to draw fluid from the soil. The vacuum may be applied at the surface and/or through vapor extraction wells placed within the soil.

Figure 14:
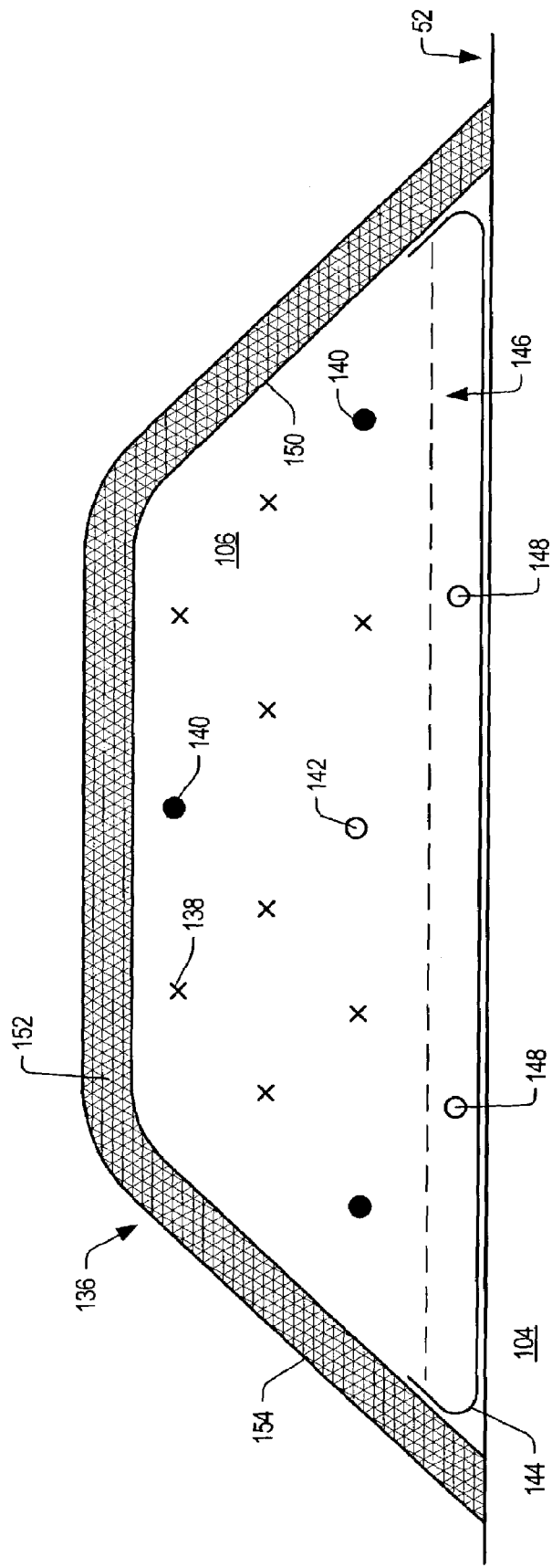
FIG. 14 depicts a vertical cross-sectional representation along a width of a pile of soil at a remediation site.

FIG. 14 depicts a vertical cross section along a substantially trapezoidal width of pile 136 of contaminated soil 106. Sloping surfaces of pile 136 may promote stability of the pile. A long axis of cased heaters 138 and/or heater/vapor extraction wells 140 may be substantially parallel to a length of pile 136. In an embodiment in which a length of pile 136 substantially exceeds a width and a height of the pile, placing cased heaters 138 and/or heater/vapor extraction wells 140 lengthwise within the pile may reduce a number of wells required to remediate a given volume of soil. One or more injection wells 142 may also be placed lengthwise within pile 136.

A liner may be placed or assembled on a ground surface at a remediation site before a pile of contaminated soil is formed. The liner may inhibit fluid (e.g., air and/or water) from entering the pile during remediation. The liner may inhibit fluid (e.g., off-gas) from escaping to the environment from the pile. In an embodiment, a bottom portion of the liner may be high temperature resistant plastic and/or metal. The sheeting may be sealed together. A bed of gravel or sand may be placed on top of the sheeting to provide a level surface and to insulate the sheeting from heat applied to soil in the pile during remediation.

As shown in FIG. 14, liner 144 may be placed on ground surface 52 of uncontaminated soil 104 before pile 136 of contaminated soil 106 is formed. Alternatively, porous layer 146 may be placed between liner 144 and contaminated soil 106. Porous layer 146 may include a freely draining material such as sand or gravel. Collection conduit 148 may be placed in porous layer 146 to collect drainage from contaminated soil 106 of pile 136. Collection conduit 148 may be connected to a contaminant treatment system.

Sealing sheet 150 may be placed on or above contaminated soil 106 of pile 136. Sealing sheet 150 may be substantially impermeable to air and/or liquid. Sealing sheet 150 may be flexible. In some embodiments, sealing sheet 150 may be a carbon steel plate or sheet that is welded together. If the soil to be remediated will generate corrosive chemicals, a sealing sheet may be made of a more chemically resistant metal than carbon steel. For example, sealing sheet 150 may be made of 316 stainless steel that is more resistant to hydrochloric acid corrosion and other corrosive chemicals than carbon steel if the contaminated soil contains chlorinated compounds that will decompose to form hydrogen chloride and/or other corrosive compounds. In some embodiments, corrosive chemicals may react with clay or other components of the soil to effectively destroy the corrosive chemicals. Corrosive chemical generation may not be a problem in such embodiments.

A soil remediation site may include insulation 152 and/or cover 154. Insulation 152 may inhibit heat loss to the environment. In an embodiment, insulation 152 may be mineral wool. Alternatively, a layer of sand or gravel or lower conductivity cement may be used to space sealing sheet 150 away from high temperatures. Cover 154 may inhibit water from entering into pile 136. In some embodiments, cover 154 may serve as a barrier to inhibit vapor loss from the remediation site. Cover 154 may be, but is not limited to, a rain tarp made of waterproof lightweight fabric, plastic sheeting, and/or sheet metal. Cover 154 may be positioned over pile 136. In some embodiments, cover 154 may be sealed to the ground and/or to remediation equipment or structures. In an embodiment, cover 154 may be positioned over contaminated soil 106 and fixed to ground surface 52. In other embodiments, cover 154 may be positioned on top of insulation 152 over contaminated soil 106 and fixed to ground surface 52.

Contaminated soil in a pile may be at least partially contained with barriers along at least a portion of a perimeter of the contaminated soil. The barriers may form a retaining structure. Retaining structures may include, but are not limited to, natural soil layers that are substantially impermeable, walls of a tank, and/or walls of a man-made remediation pit. Retaining structures may be used advantageously for remediation of soil that contains potentially explosive contaminants. In some embodiments, retaining structures and materials may be reused for subsequent treatment of contaminated soil.

Figure 15:
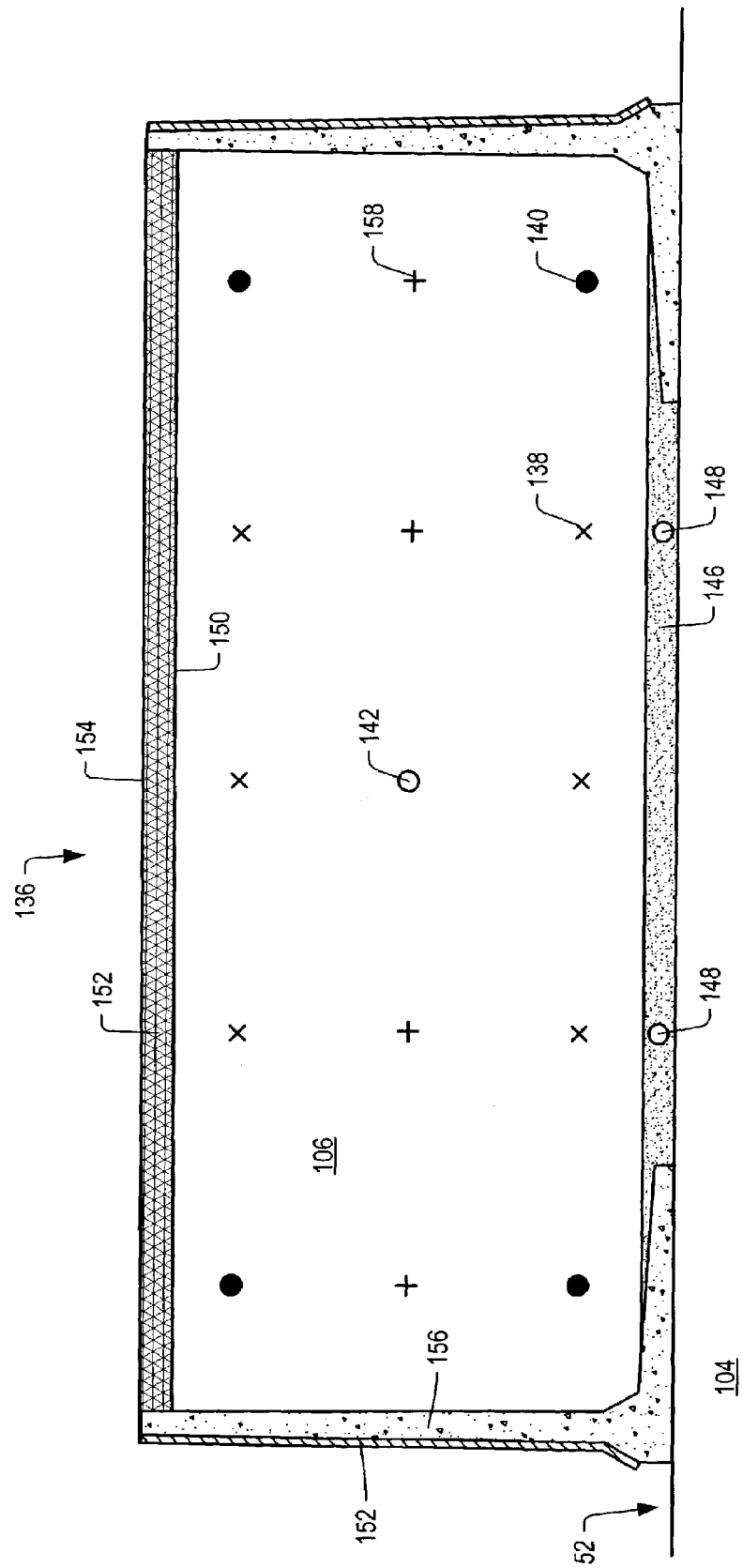
FIG. 15 depicts a vertical cross-sectional representation along a width of a pile of soil contained by a retaining structure.

FIG. 15 depicts pile 136 of contaminated soil at least partially surrounded by retaining structure 156. In an embodiment, retaining structure 156 may include concrete retaining walls. In some embodiments, one or more retaining walls may be formed of assembled sections. Sections may be disassembled and moved to facilitate insertion and removal of soil and connection of central remediation system equipment (e.g., power and vacuum sources). Retaining structure 156 may include a base, such as a concrete slab. Retaining structure 156 may be at least partially surrounded by insulation 152. In an embodiment, insulation 152 may be styrofoam insulation. In some embodiments, an inner surface of the side walls may be insulated with materials such as firebrick to inhibit thermal degradation of the side walls during remediation of contaminated soil.

In an embodiment, one or more of side walls of retaining structure 156 may include openings that allow for passage of monitoring equipment and heaters and/or vacuum system equipment into soil 106. Soil 106 in retaining structure 156 may be leveled before introduction of heaters and/or vacuum system equipment. In an embodiment, soil 106 may be leveled by earthmoving equipment lowered into in retaining structure 156 by a crane. In some embodiments, bare heaters 158, cased heaters 138, heater/vapor extraction wells 140, and injection well 142 may be placed as shown in FIG. 15. A horizontal spacing between heaters and wells may be about 1 m to about 2 m. A vertical spacing between heaters and wells may be about 1 m. Collection conduit 148 may be placed in porous layer 146. A bottom row of heaters and wells may be spaced about $\frac{1}{3}$ m above a top of porous layer 146. Sealing sheet 150, insulation 152, and cover 154 may be placed on top of contaminated soil 106 and/or coupled to retaining structure 156. A top row of heaters and wells may be spaced about ⅓ m below sealing sheet 150.

Other types of barriers may be placed around a contamination site to provide at least partial containment of contaminated soil. U.S. Pat. No. 6,419,769 of Vinegar et al., which is incorporated by reference as if fully set forth herein, describes a barrier for an in situ soil remediation system. A barrier may be metal plates driven into the soil around a perimeter of a contaminated soil region. In other embodiments a barrier may be, but is not limited to, a grout wall formed in the soil, and/or a frozen barrier formed by freeze wells spaced around a treatment area.

A remediation site, such as pile 136 shown in FIGS. 14 and 15, may include one or more vacuum ports. A vacuum port may extend through and be sealed to sealing sheet 150. The vacuum port may be coupled with contaminated soil 106. Air and vapors may be removed from soil 106 through the vacuum port. Air and vapors from soil 106 may be conducted from the vacuum port to a treatment system or treatment facility. Vapors may also be removed from contaminated soil 106 through a conduit. In some embodiments, a conduit may be coupled to a lower portion of pile 136. A ventilating layer below contaminated soil 106 in pile 136 may allow vapors to be drawn from contaminated soil 106 into the conduit. The ventilating layer may be a perforated plate. Vapors from contaminated soil 106 may be transported through the conduit to a treatment facility.

In some soil remediation system embodiments, a treatment system for processing off-gas from contaminated soil may include a thermal oxidizer or reaction system for destroying contaminants in an off-gas stream from soil remediation. The thermal oxidizer may heat the off-gas to a high temperature to destroy some contaminants within the off-gas. The use of thermal oxidizers may be minimized and/or eliminated due to the large costs associated with purchase, transportation, and operation of thermal oxidizers. At some soil remediation sites, the use of thermal oxidizers or other types of reactors may not be as practical as, for example, absorbent carbon beds.

Processing of a pile of soil at a remediation site may be achieved using a central power supply, a central off-gas treatment system, and central instrumentation and power control systems. As a pile of soil is formed, wells (e.g., heater wells and vapor extraction wells) and conduit may be placed in the soil and coupled to central equipment for remediation. After remediation, central equipment may be uncoupled from wells and conduit in the pile before removal of the treated soil. In an embodiment in which a pile of contaminated soil is partially contained by end walls, such as buttressed concrete end walls, central equipment may be coupled to wells and conduit in the soil through an end wall. In some embodiments, all or part of a horizontal layer of wells may be structurally coupled together. The wells may be moved as a unit using moving equipment (e.g., a crane).

Several piles of contaminated soil may be formed at a remediation site to process contaminated soil. In some embodiments, piles may be treated sequentially for efficient use of available power and central equipment. For example, a first pile of contaminated soil may be prepared. A vacuum may be drawn on the first pile and heating of the first pile may be initiated. While the first pile is heating, a second pile may be formed. When processing of the first pile is complete, a central power supply may be decoupled from heaters in the first pile, and the power supply may be coupled to heaters in the second pile. Heating of the second pile may be initiated. In some embodiments, heat of the first pile may be transferred to the second pile to facilitate heating of the second pile. A third pile of contaminated soil may be formed for processing when remediation of soil in the second pile is completed. When soil in the third pile is processed, processed soil in the first pile may be removed and replaced by a new batch of contaminated soil. A cycle of use of the first pile, the second pile, and the third pile may be repeated to complete remediation of all contaminated soil. In an embodiment, the number of piles used at a remediation site may range from two to six.

In certain embodiments, placement of heaters and vapor extraction wells may result in partial removal of contamination from bottom edge portions ("fringe area") of the pile. After treatment of a pile of soil, soil from a fringe area of the pile may be treated as part of another contaminated pile formed subsequently.

In some embodiments, a first heated soil pile may be used to destroy contaminants in an off-gas stream from soil in a second pile undergoing remediation. In some embodiments, a thermal oxidizer or other reactor may be used to process contaminants removed during remediation of soil in a first pile. In other embodiments, soil in a first pile may be substantially uncontaminated so that a treatment facility without a thermal oxidizer or other reactor is able to handle contaminants in an off-gas stream removed during remediation. For example, soil in a first pile may originate from a fringe area of soil contamination.

Soil in a first pile may be heated and remediated. After remediation, heaters may maintain a high temperature within the first pile, and a vacuum may be maintained on the first pile. Remediation of soil in the first pile may result in soil that is permeable and at a high temperature. In some embodiments, a soil-filled roll off container may be used instead of a first pile of soil. A second pile of contaminated soil may be formed. The second pile of contaminated soil may be formed during remediation of the first pile. Vapor extraction wells of the second pile may be coupled to injection wells of the first pile. In some embodiments, a blower or other drive system may be coupled between extraction wells of the second pile and injection wells of the first pile to facilitate movement of off-gas from the second pile to the first pile. The second pile may be heated and remediated. Off-gas from the second pile may be directed through injection wells into the heated first pile. A portion of contaminants from the second pile may be destroyed by pyrolysis reactions or oxidation reactions in the first pile. Some of the pyrolysis reactions and/or oxidation reactions may be exothermic reactions that facilitate maintenance of a high temperature in the first pile. Vacuum drawn on the first pile may draw off-gas from the first pile to a treatment facility.

In some soil remediation system embodiments, a soil treatment site may be a long, substantially rectangular remediation pit. For example, a soil remediation pit may be a concrete lined pit that is about 100 m long, about 30 m wide and about 2 m deep. Remediation pits having longer or shorter lengths, widths, and/or depths may also be used. Several soil remediation pits may be in use at a remediation site.

Figure 16:
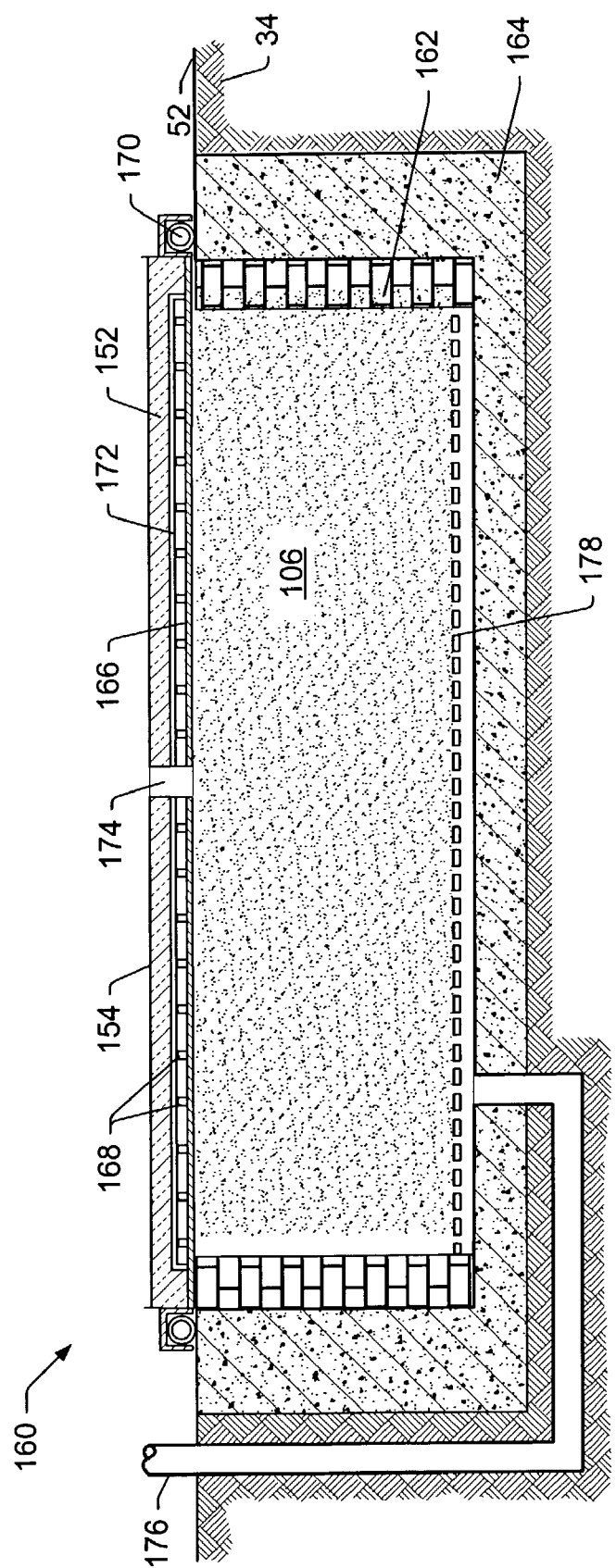
FIG. 16 depicts contaminated soil in a remediation pit.

FIG. 16 depicts an embodiment of soil remediation pit 160. Contaminated soil 106 may be at least be partially contained in remediation pit 160. Remediation pit 160 may be prepared such that leaching of contaminants from soil 106 into surrounding soil and/or migration of contaminants from the soil is minimized or prevented. Remediation pit 160 may be an excavated area. Sides of a remediation pit may be lined with thermal insulation 162. Thermal insulation 162 may minimize heat loss to surrounding soil 34 during treatment of contaminated soil 106. Thermal insulation 162 may reduce heat loss from contaminated soil 106, thereby effectively increasing a heating rate of the soil. Thermal insulation 162 may include, but is not limited to, cement, sand, and/or firebrick.

Remediation pit 160 may also include vapor seal 164 at least partially surrounding thermal insulation 162. Lower sealing sheet 166 may be placed on surface 52 of soil 106. Lower sealing sheet 166 may be flexible to accommodate settling of the soil due to compaction and/or material removal (e.g., water and/or contaminants) during a remediation procedure. Lower sealing sheet 166 may be substantially impervious to air and/or liquid.

In some embodiments, heaters 168 may be placed on top of lower sealing sheet 166. Heaters 168 may heat soil 106. Seal 170 may be positioned around a perimeter of remediation pit 160. Seal 170 may be positioned on a surface of vapor seal 164 to provide an edge seal for heaters 168 and/or lower sealing sheet 166. Seal 170 may be inflatable rubber tubing to allow sealing of irregular surfaces. Seal 170 may be positioned far enough away from heaters 168 to avoid heating of the seal. Remediation pit 160 may be covered at least partially with insulation 152 to inhibit heat loss to the environment. In an embodiment, insulation 152 may be mineral wool. Upper sealing sheet 172 may be placed between heaters 168 and insulation 152.

Cover 154 may be positioned over insulation 152. Cover 154 may inhibit water from entering into remediation pit 160. In some embodiments, cover 154 may serve as a barrier to inhibit vapor loss from the remediation site. Cover 154 may be, but is not limited to, a rain tarp made of waterproof lightweight fabric, plastic sheeting, and/or sheet metal. Cover 154 may be positioned over remediation pit 160. In some embodiments, cover 154 may be sealed to the ground and/or to remediation equipment or structures. In an embodiment, cover 154 may be positioned over contaminated soil 106 and fixed to ground surface 52. In other embodiments, cover 154 may be positioned on top of insulation 152 over contaminated soil 106 and fixed to ground surface 52.

A remediation site may include one or more vacuum ports 174. Vacuum port 174 may extend through and be sealed to sealing sheets 166, 172. Air and vapors may be removed from soil 106 through vacuum port 174. Air and vapors from soil 106 may be conducted from vacuum port 174 to a treatment system or treatment facility. Vapors may also be removed from contaminated soil 106 through conduit 176. In some embodiments, conduit 176 may be coupled to a lower portion of remediation pit 160. Ventilating layer 178 below soil 106 in remediation pit 160 may allow vapors to be drawn from contaminated soil 106 into conduit 176. Ventilating layer 178 may be a perforated plate. Vapors from soil 106 may be transported through conduit 176 to a treatment facility.

In an embodiment of a remediation system, conduit 176 may be attached to a fluid supply. Fluid may be introduced into contaminated soil 106 through conduit 176. The fluid may be, but is not limited to, steam or liquid water, a solvent, a surfactant, a chemical reactant such as an oxidant, a biological treatment carrier, a drive fluid, and/or a heat transfer fluid. A solvent or surfactant may be used to increase fluid flow through contaminated soil 106 toward vacuum port 174. A reactant may react with contaminants to destroy contaminants and/or convert contaminants into volatile reaction products. The reaction products may be removed from the soil through vacuum port 174. A drive fluid may be used to move contaminants entrained in vapors toward vacuum port 174. A heat transfer fluid may be used to promote convective transfer of heat through the soil.

In some embodiments, a first conduit or conduits may allow a vacuum to be drawn on soil in a remediation pit from below the remediation pit. A second conduit or conduits may allow for fluid insertion into the remediation pit from below the soil in the remediation pit. A remediation system with a first conduit or conduits for drawing a vacuum and a second conduit or conduits for inserting fluids may allow for drawing a vacuum on a remediation pit and for inserting fluid into a remediation pit without the need to change equipment during a remediation process.

Figure 17:
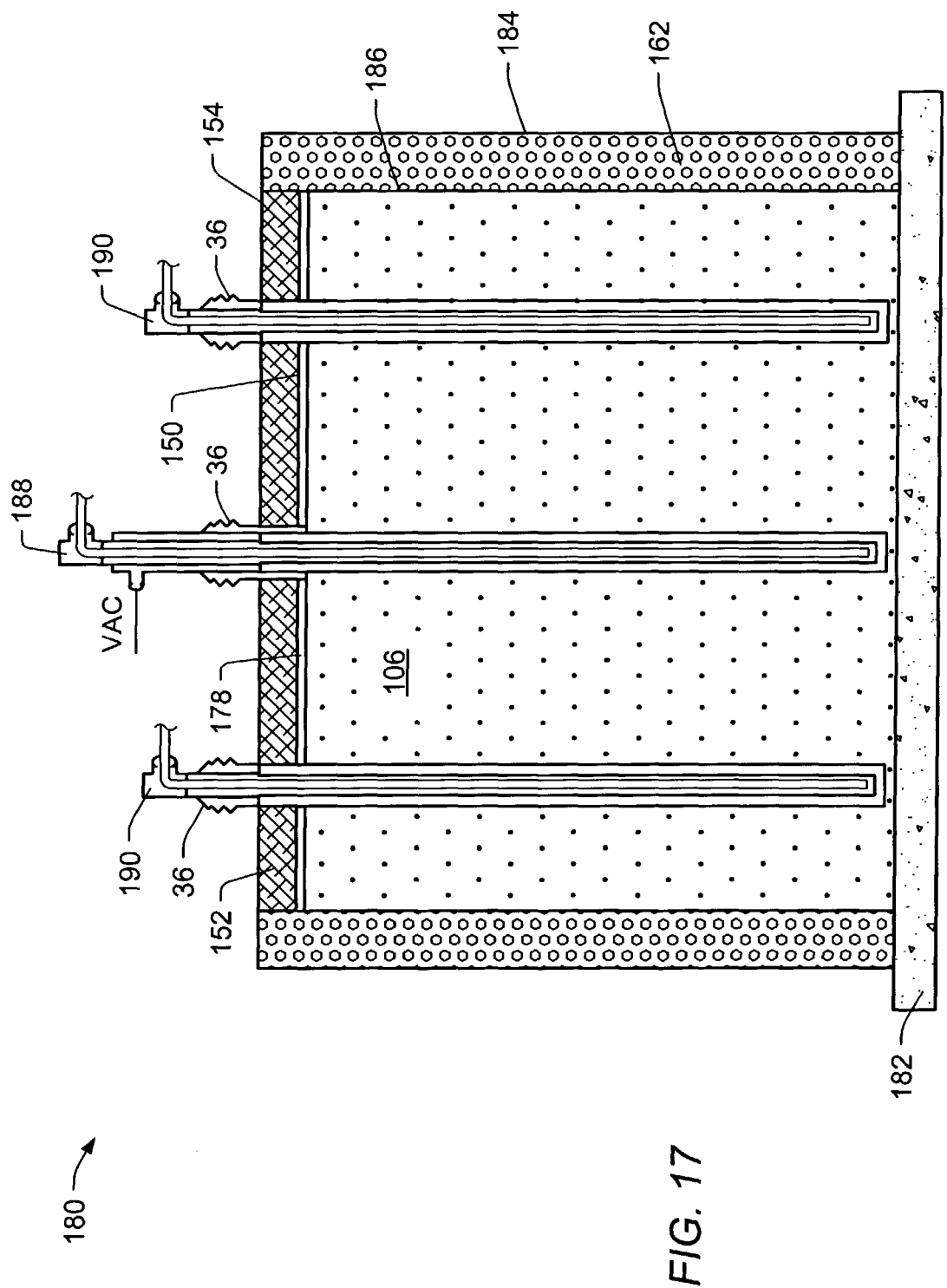
FIG. 17 depicts contaminated soil in a tank.

Contaminated soil may be placed into tanks. FIG. 17 depicts an embodiment of contaminated soil 106 in tank 180 for ex situ remediation of the soil. Tank 180 may be formed on base 182. In an embodiment, base 182 may be made of a rigid, substantially impermeable substance such as concrete. Base 182 may serve as a lower insulation layer for tank 180. Tank 180 may include an outer lining or shell 184. The annular space formed between inner lining 186 and shell 184 may be filled with thermal insulation 162. Thermal insulation 162 may be, but is not limited to, cement, sand, firebrick, and/or mineral wool.

In some embodiments, ventilating layer 178 may be located on or adjacent to a surface of soil 106. Vapor extraction well 188 may be coupled to the space above ventilating layer 178 so that the vapor extraction well is able to draw vacuum on soil 106 below the ventilating layer. In an embodiment, vapor extraction well 188 may be a heater/vapor extraction well. Vapors may be conducted through ventilating layer 178 toward vapor extraction well 188. In an embodiment, a vacuum source may draw vapors through ventilating layer 178 toward vapor extraction well 188. Ventilating layer 178 may be, but is not limited to, a grating, perforated sheet metal, and/or chain-link fence. An outer casing of vapor extraction well 188 may be perforated to allow vapors to enter the well and be removed by the vacuum source. The vapors may be conducted from vapor extraction well 188 to a treatment facility. Sealing sheet 150 may be placed between ventilating layer 178 and insulation 152 above soil 106 to serve as a vacuum seal.

In some embodiments, heater wells may be arranged substantially vertically within soil 106 in a regular or substantially regular pattern. For example, heater wells may be arranged in a hexagonal pattern around vapor extraction well 188 within contaminated soil 106 in tank 180. In some embodiments, heater wells and/or vapor extraction wells may be slanted or placed substantially horizontally in the soil. Heater wells 190 and vapor extraction well 188 may extend through precut holes in ventilating layer 178, sealing sheet 150, and insulation 152 above soil 106. Sealing sheet 150 may be sealed to top hats of heater wells 190 and vapor extraction wells 188. Allowances in heater wells, vapor extraction wells, and seals of the wells to sealing sheet may allow for thermal expansion and for shrinkage of soil due to material loss (e.g., water loss). Sealing sheet 150 may be sealed to tank 180. Depending on the temperature to which the seals will be subjected, the seals may be formed of rubber, silicone, and/or metal welds.

Clean soil may be used as insulation around retaining structures. For example, a clean soil berm may be formed around tank 180. In an embodiment, a clean soil berm may surround shell 184. A clean soil berm may also be used as thermal insulation 162 between lining 186 and shell 184. When soil 106 is heated, a portion of the berm adjacent to tank 180 may dry out. The dry soil may act as insulation for tank 180. In some embodiments, insulation may be coupled to outer surface of shell 184.

Figure 18:
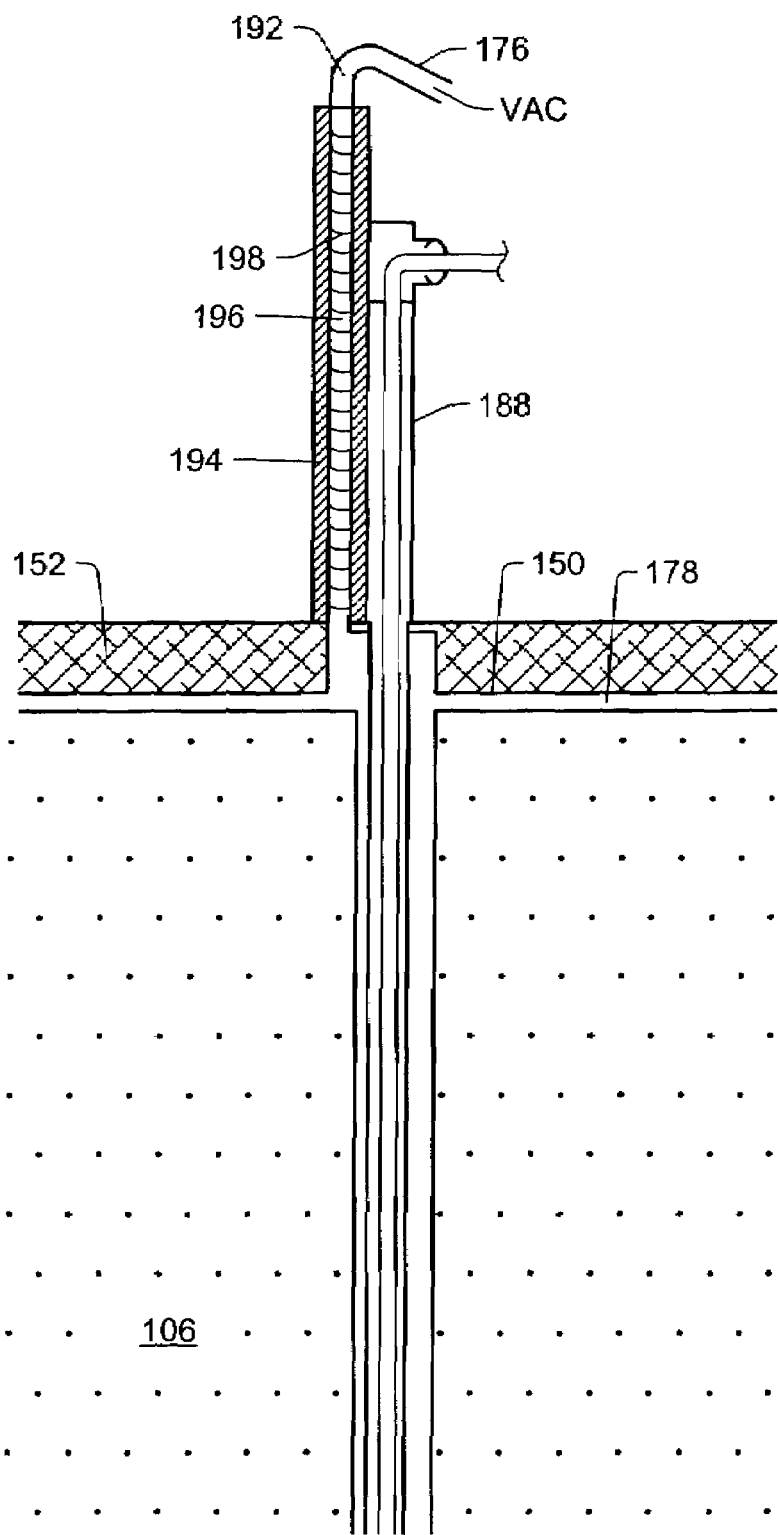
FIG. 18 depicts a heated riser for removing contaminants from contaminated soil.

FIG. 18 depicts an embodiment of a portion of a remediation system that includes risers 192. Risers 192 may be used to remediate soil that contains dense non-aqueous phase liquids that have medium to high boiling points and do not significantly thermally degrade at temperatures used during remediation. For example, risers may be used in a soil remediation system for remediating soil contaminated with mercury. In an embodiment, riser 192 is a heated riser. Riser 192 may be coupled to sealing sheet 150 above ventilating layer 178. A portion of vapor extraction well 188 that extends above soil 106 may be a riser. Insulation 194 may cover a portion of riser 192. In an embodiment, insulation 194 may cover ascending portion 196 of riser 192. Ascending portion 196 may be heated with heater 198 to a temperature greater than a boiling point of a contaminant to be removed from the soil. Heat supplied by heater 198 may inhibit condensation of the contaminant in riser 192.

Conduit 176 exiting riser 192 may conduct vapor removed from soil to a treatment facility. Conduit 176 may be coupled to a vacuum system. In some embodiments, all or portions of conduit 176 may not be insulated. Vapor may be allowed to condense within conduit 176. Conduit 176 may be maintained at a temperature sufficient to inhibit formation of solids in the conduit. Riser 192 may have sufficient height so that a slope of conduit 176 towards a treatment facility will facilitate flow of any condensed liquids in the conduit to the treatment facility.

Figure 19:
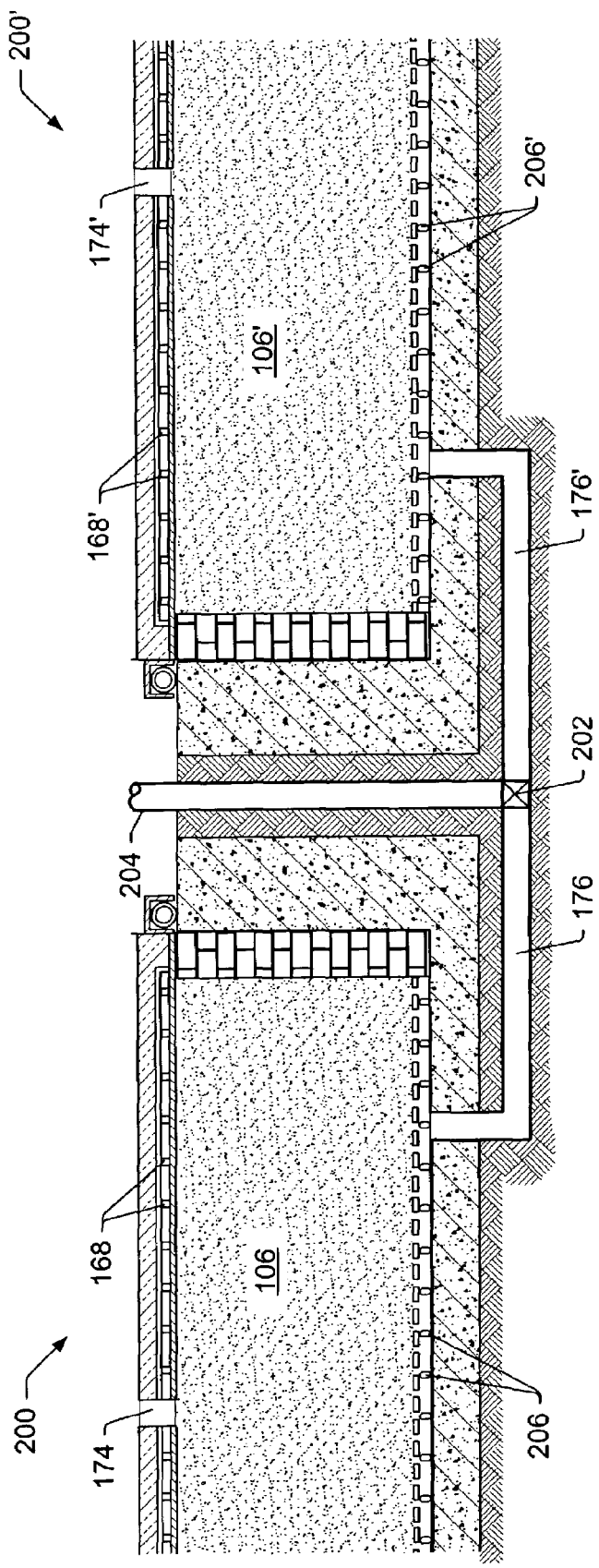
FIG. 19 depicts an embodiment of a remediation site including two treatment sites.

A soil remediation site may include at least two treatment sites. In a soil remediation embodiment, at least a portion of the vapors produced by heating soil at a first treatment site may be used to provide heat to contaminated soil at a second treatment site. FIG. 19 depicts an embodiment of a soil remediation site including two treatment sites. Remediation site 200 may contain soil 106 and remediation site 200' may contain soil 106'. In an embodiment, site 200 and/or site 200' may be, for example, a remediation pit or a pile of soil. When soil 106, 106' is initially placed in sites 200, 200', soil 106 may contain substantially the same contaminants or different contaminants than soil 106'. Sites 200, 200' may be coupled together by conduits. Valve system 202 may be used to control flow of fluids between sites 200 and 200' through conduits 176, 176', and 204. Valve system 202 may include a valve in conduit 176 from site 200, a valve in conduit 176' from site 200', and a valve in other conduits 204 at the remediation site. Valve system 202 may be located in a readily accessible portion of the remediation site.

Conduits 176, 176' are shown schematically in FIG. 19 as single pipes entering/leaving sites 200, 200'. In a remediation system, conduits 176, 176' may be a plurality of conduits that enter/leave sites 200, 200' at several locations. In an embodiment, conduits 176, 176' may enter/leave a manifold adjacent to valve system 202.

Soil 106 in site 200 may be heated with heaters 168. Heaters 168 may be located in soil 106, above the soil, and/or below the soil. Valve system 202 may be set to inhibit fluid transfer from site 200 to site 200' during heating of soil 106 in site 200. A vacuum source may be used to apply a vacuum through vacuum port 174 during heating and remediation of soil 106. In some embodiments, vacuum may also be drawn through conduits 176, 204 to remove vapor from site 200. After contaminated soil 106 in site 200 is treated, heaters 168 may be turned off. After heaters 168 are turned off, application of the vacuum may be discontinued. Subsequently, valve system 202 may be set to connect sites 200 and 200'. A vacuum source may be coupled to vacuum port 174' in treatment site 200'. Air may be introduced at vacuum port 174 and allowed to flow down through soil 106 and through conduits 176, 176' to site 200'. Air moving through site 200 may be heated by soil 106. The heat of the air may transfer to soil 106' in treatment site 200'. Heat transfer to air passing through soil 106 in treatment site 200 may cool soil 106. Heaters 168' may be used to supply additional heat to soil 106' in site 200'. Transferring heat from site 200 to site 200' may substantially reduce the amount of energy needed to be supplied to soil 106' from heaters 168'. Transferring heat from site 200 to site 200' may substantially reduce the amount of time needed to cool soil 106 so that the soil is cool enough to process (e.g., move to a new location).

In some process embodiments, conduit 204 may be attached to a fluid supply to introduce fluid into soil 106 in site 200 or soil 106' in site 200'. In some process embodiments, conduit 204 may be connected to a vacuum system to draw fluid out of soil 106 and/or soil 106'. Fluid introduced into soil 106 and/or soil 106' may be used to treat the soil in site 200 and/or site 200'. The fluid may be used to move contaminants within soil 106 and/or soil 106' to facilitate remediation. Additionally, the fluid may be used to assist the transfer of vapors between site 200 and site 200'. Valve system 202 may be set to direct fluid to site 200 and/or site 200'. For example, valve system 202 may allow fluids to enter site 200 through conduits 204 and 176 during heating and remediation of soil 106. Vacuum applied through vacuum port 174 may draw fluid into soil 106. Valve system 202 may be set to prevent fluid from entering site 200 after soil 106 is fully treated. If required, additional "block and blend" valve arrangements may be installed to positively inhibit back flow of fluids into previously cleaned soil. After treatment of site 200, valve system 202 may be adjusted to allow fluid to flow from site 200 to site 200'. During remediation of contaminated soil 106' in site 200', valve system 202 may be positioned to allow fluid to enter site 200'. In some embodiments, a pump may be coupled to conduit 204 to force fluid into soil 106 and/or soil 106'.

In an embodiment, heated soil at one site may be used to at least partially destroy contaminants in vapors produced from soil at another site. Soil 106 in site 200 may be thermally remediated to remove or reduce contamination within the soil. Soil in site 200 may be heated to a high temperature. The temperature may be sufficient to allow for pyrolysis, oxidation, or other chemical reaction of contaminants within vapor that are drawn through the soil. In some embodiments, an average temperature of soil in site 200 may be less than about 200° C., less than about 300° C., less than about 400° C., less than about 500° C., or less than about 600° C.

After soil 106 in site 200 is raised to a desired temperature, heating of soil 106' in site 200' may be initiated. Vapors removed from site 200' may be drawn by a vacuum through site 200. For example, in FIG. 19, valve system 202 may be set to allow a vacuum pulled through vacuum port 174 to draw vapor from soil 106' through conduits 176', 176 and into soil 106. If desired, a reactant such as an oxidant (e.g., air, oxygen, and/or hydrogen peroxide), or other chemical may be introduced into the vapor by setting valve system 202 to allow the reactant to be drawn toward soil 106.

In other embodiments, soil 106 initially heated at site 200 may be contaminated soil. Contaminants removed from the soil during heating may be directed to a treatment facility. The treatment facility may include a transportable thermal oxidizer that destroys the contaminants. When the soil is heated to the desired temperature, the thermal oxidizer may no longer be needed to treat contaminants from soil being remediated. The thermal oxidizer may be removed. In some embodiments, soil 106 in site 200 may initially be uncontaminated or substantially uncontaminated soil that is heated to a high temperature. Uncontaminated or substantially uncontaminated heated soil 106 in site 200 may be used treat contaminants from soil 106', thus reducing equipment requirements of a coupled treatment facility.

Contaminants in the vapor from soil 106' may be destroyed within heated soil 106 in site 200. In some embodiments, an oxidant or other reactant may be drawn into site 200 to facilitate destruction of contaminants in heated soil. Reactions of contaminants from soil 106' may be exothermic reactions that contribute to maintenance of high soil temperature in site 200. Soil 106 site 200 may be maintained at a high temperature. Heating soil 106 site 200 may result in the soil having a high permeability and a large surface area. The heat and large surface area may advantageously be used to destroy contaminants produced from a second site, such as site 200'.

In certain embodiments, including the embodiment shown in FIG. 19, a conduit may be used to introduce a fluid (e.g., air) to a site to accelerate heat transfer through contaminated soil at the site. For example, contaminated soil 106 in site 200 of FIG. 19 may be heated from the top with heaters 168 and heated from the bottom with heaters 206, until a desired temperature is established in the soil. Heaters 168 may be turned off and air may be introduced to a lower portion of contaminated soil 106 through conduit 176. The air may draw heat from heaters 206. As heat is transferred to the air, an injection rate of heat from heaters 206 may be increased. The heated air may transfer the heat upward through contaminated soil 106. A vacuum source may be coupled to vacuum port 174. Air may be drawn through contaminated soil 106 toward vacuum port 174. The vacuum may be used to control airflow through (i.e., the heating rate of) the soil. Use of a fluid (e.g., air) to transfer heat through contaminated soil 106 may reduce the energy requirements for remediation of contaminated soil 106 in site 200.

In an embodiment, ex situ remediation may be used in conjunction with in situ soil remediation to remediate soil. For example, a heated zone of subsurface soil may be used as a site to at least partially destroy contaminants in vapors from another site. In other embodiments, soil from more than one location may be remediated at one treatment site.

Figure 20:
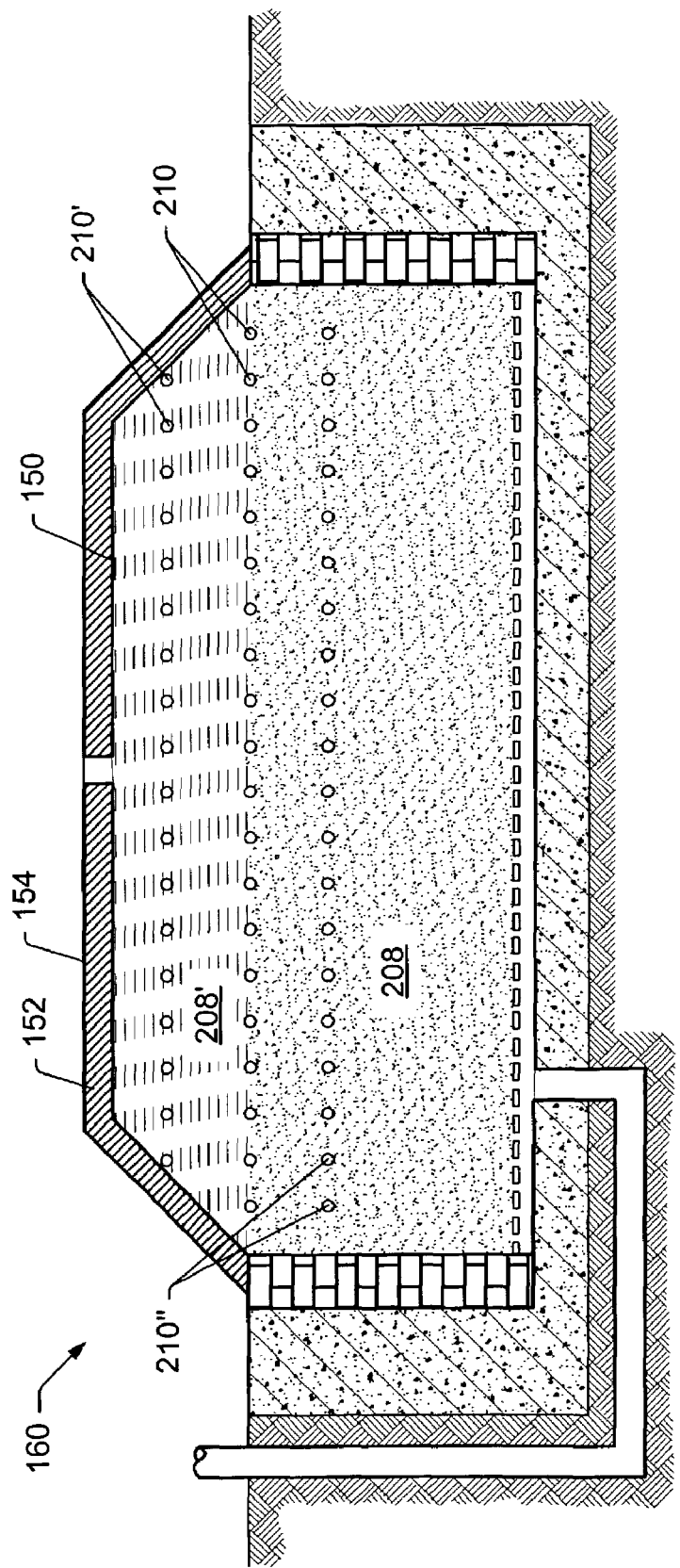
FIG. 20 depicts an embodiment of simultaneous remediation of contaminated soil from more than one location.

FIG. 20 depicts an embodiment that may be used to remediate contaminated soil from more than one location simultaneously. Lower portion 208 of contaminated soil may be collected in remediation pit 160 for ex situ remediation. Alternatively, lower portion 208 of contaminated soil may be a location of subsurface contamination contained by barriers. Heaters 210 may be placed above lower portion 208 of contaminated soil. Upper portion 208' of contaminated soil may be placed above heaters 210. Heaters 210' may be placed within upper portion 208' of contaminated soil. Heaters 210, 210' may include, but are not limited to, heater blankets, strip heaters, and/or bare wires. Alternatively, heaters 210, 210' may be a horizontal arrangement of heater wells and/or heater/vapor extraction wells. Lower portion 208 and upper portion 208' of contaminated soil at the site may be collected from more than one location and may contain substantially the same or substantially different contaminants. Sealing sheet 150, insulation 152 over soil, and cover 154 may be placed above upper portion 208' of contaminated soil. Upper portion 208' and lower portion 208 of contaminated soil, which may originate from more than one location, may be heated with heaters 210, 210' at substantially the same time within remediation pit 160.

For deeper sites of contaminated soil, trenches may be formed in lower portion 208 of contaminated soil, and heaters 210" may be placed in the trenches. Alternatively, remediation pit 160 may be partially filled with contaminated soil. Heaters 210" may be placed on the soil, and more contaminated soil placed over the heaters. Alternatively, heater wells and/or heater/vapor extraction wells may be arranged vertically within lower portion 208 of contaminated soil and/or upper portion 208' of contaminated soil.

A layered arrangement of heaters, as shown in FIG. 20, may be used to provide relatively rapid and substantially even heating at a remediation site. In an embodiment, two or more coupled remediation sites (e.g., sites 200 and 200' shown in FIG. 19) may be heated simultaneously with layered arrangements of heaters.

Embodiments described herein may be used for high temperature removal of contaminants from contaminated soil at one or more sites. High temperature materials for heating and containing the contaminated soil may be incorporated depending on the expected temperature requirements and properties of the contaminants and vapors produced. Embodiments may also be used for low temperature dewatering of contaminated sludge. Steel tanks may be used for containing the contaminated sludge. Dewatering sludge may substantially reduce a volume of wet soil to facilitate handling of the soil and contaminants within the soil.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed:

1. A method of remediating contaminated soil, comprising:
   collecting contaminated soil;
   providing at least partial containment of contaminated soil at a plurality of sites, comprising at least a first site with first contaminated soil and a second site with second contaminated soil;
   heating the first contaminated soil at the first site, wherein at least a portion of the first contaminated soil is heated using one or more heaters, wherein at least one of the heaters is an electrical resistance heater; and
   using vapors produced by heating the first contaminated soil at the first site to at least partially heat the second contaminated soil at the second site.

2. The method of claim 1, further comprising directing a fluid to a portion of the first contaminated soil such that the fluid drives the vapors toward the second contaminated soil.

3. The method of claim 1, wherein the first site and the second site are coupled to each other through a conduit configured to allow the vapors from the contaminated soil at the first site to enter the contaminated soil at the second site.

4. The method of claim 1, wherein at least the partial containment is configured to reduce heat loss from the first site.

5. The method of claim 1, wherein at least the partial containment is configured to reduce heat loss from the second site.

6. The method of claim 1, wherein at least the partial containment comprises inflatable rubber tubing along a perimeter of the first contaminated soil.

7. The method of claim 1, wherein heating the contaminated soil at the first site at least partially destroys contaminants in the first contaminated soil.

8. The method of claim 1, further comprising gathering high boiling point contaminants through one or more heated risers disposed in the contaminated soil at the first site during heating of the first site.

9. The method of claim 1, further comprising gathering high boiling point contaminants through one or more heated risers disposed in the contaminated soil at the second site during heating of the second site.

10. The method of claim 1, wherein the contaminated soil at the first site comprises a sludge, and wherein heating the first contaminated soil at least partially dewaters the sludge.

11. The method of claim 1, wherein the contaminated soil at the second site comprises a sludge, and wherein heating the second contaminated soil at least partially dewaters the sludge.

12. A method of remediating contaminated soil, comprising:
   providing at least partial containment to a site of contaminated soil, wherein the contaminated soil comprises an upper portion and a lower portion;
   heating the contaminated soil, wherein at least a portion of the contaminated soil is heated using one or more heaters, wherein at least one of the heaters is an electrical resistance heater; and
   directing fluid from the lower portion of the contaminated soil into the upper portion of the contaminated soil, such that the fluid transfers heat from the lower portion to the upper portion of the contaminated soil.

13. The method of claim 12, further comprising insulating at least a portion of the contaminated soil.

14. The method of claim 12, wherein the at least partial containment is configured to reduce heat loss from the contaminated soil.

15. The method of claim 12, wherein at least the partial containment comprises a remediation pit.

16. The method of claim 12, wherein at least the partial containment comprises inflatable rubber tubing along a perimeter of the contaminated soil.

17. The method of claim 12, wherein heating the contaminated soil at least partially destroys contaminants in the soil.

18. The method of claim 12, further comprising gathering high boiling point contaminants through one or more heated risers disposed in the contaminated soil.

19. The method of claim 12, wherein a portion of the contaminated soil comprises a sludge, and wherein heating the contaminated soil at least partially dewaters the sludge.

20. The method of claim 12, wherein heating the soil comprises using bare strips of at least one heater wire thermally coupled to the contaminated soil.

21. The method of claim 12, wherein heating the soil comprises applying heat proximate the upper portion and the lower portion of the contaminated soil.

22. A method of remediating contaminated soil, comprising:
   providing at least partial containment to a site of contaminated soil, wherein the contaminated soil comprises an upper portion and a lower portion;
   disposing a first heat source between the upper portion and the lower portion of the contaminated soil;
   disposing a second heat source in the upper portion of the contaminated soil; and
   heating the contaminated soil with the first heat source and the second heat source to at least partially heat the upper portion and the lower portion of the contaminated soil at substantially the same time; and
   wherein at least one of the heat sources is an electrical resistance heater.

23. The method of claim 22, further comprising disposing a third heat source in one or more shallow trenches in the lower portion of the contaminated soil.

24. The method of claim 22, wherein the lower portion of the contaminated soil comprises a location of near surface soil contamination.

25. The method of claim 22, wherein at least the partial containment is configured to reduce heat loss from the contaminated soil.

26. The method of claim 22, wherein at least the partial containment comprises a remediation pit.

27. The method of claim 22, wherein heating the contaminated soil at least partially destroys contaminants in the soil.

28. The method of claim 22, wherein a portion of the contaminated soil comprises a sludge, and wherein heating the contaminated soil at least partially dewaters the sludge.

29. The method of claim 22, wherein heating the soil comprises applying heat proximate the upper portion and the lower portion of the contaminated soil.

* * * * *